(12) United States Patent
Jitaru

(10) Patent No.: US 12,057,780 B2
(45) Date of Patent: Aug. 6, 2024

(54) VERY HIGH EFFICIENCY SOFT SWITCHING CONVERTER AKA THE ADJUD CONVERTER

(71) Applicant: Rompower Technology Holdings, LLC, Milford, DE (US)

(72) Inventor: Ionel Jitaru, Tucson, AZ (US)

(73) Assignee: Rompower Technology Holdings, LLC, Milford, DE (US)

( * ) Notice: Subject to any disclaimer, the term of this patent is extended or adjusted under 35 U.S.C. 154(b) by 0 days.

(21) Appl. No.: 18/238,981

(22) Filed: Aug. 28, 2023

(65) Prior Publication Data

US 2023/0402933 A1    Dec. 14, 2023

Related U.S. Application Data

(63) Continuation of application No. 17/228,462, filed on Apr. 12, 2021, now Pat. No. 11,742,768, which is a
(Continued)

(51) Int. Cl.
*H02M 3/335*    (2006.01)
*H02M 1/08*    (2006.01)
(Continued)

(52) U.S. Cl.
CPC ....... *H02M 3/33592* (2013.01); *H02M 1/083* (2013.01); *H02M 3/33571* (2021.05);
(Continued)

(58) Field of Classification Search
CPC ........... H02M 3/3353; H02M 3/33546; H02M 3/33561; H02M 3/33569; H02K 3/012
See application file for complete search history.

(56) References Cited

U.S. PATENT DOCUMENTS

| 6,246,592 B1 * | 6/2001 | Balogh | H02M 3/33592 363/16 |
| 2010/0164279 A1 * | 7/2010 | Dishman | H02M 3/33561 307/17 |

(Continued)

FOREIGN PATENT DOCUMENTS

WO    WO-2014183132 A1 *    11/2014    .............. H02M 1/08

*Primary Examiner* — Gary A Nash
(74) *Attorney, Agent, or Firm* — Thomas W. Galvani, P.C.; Thomas W. Galvani

(57) ABSTRACT

A two-transistor forward switching cell includes two primary switching elements connected between an input voltage source and a primary winding of a transformer. The switching elements are connected to the primary winding at opposite ends of the winding. Reset diodes are connected between one of the opposite ends of the primary winding and one termination of the voltage source, and between another of the opposite ends of the primary winding and another termination of the voltage source. The transformer has at least a secondary winding connected to drains of synchronous rectifiers. One of the rectifiers is on during at least a portion of a time when the switching elements are on. The other of the rectifiers is a freewheeling rectifier, is connected to at least one controlled current source, and is off when the switching elements are on. Both rectifiers are on for a common predetermined time.

1 Claim, 29 Drawing Sheets

Related U.S. Application Data continuation of application No. 16/989,812, filed on Aug. 10, 2020, now Pat. No. 10,978,958, which is a continuation of application No. 15/627,832, filed on Jun. 20, 2017, now Pat. No. 10,742,129.

(60) Provisional application No. 62/352,411, filed on Jun. 20, 2016.

(51) Int. Cl.
*H02M 1/00* (2006.01)
*H02M 3/00* (2006.01)
*H02M 3/158* (2006.01)

(52) U.S. Cl.
CPC .......... *H02M 1/0058* (2021.05); *H02M 1/007* (2021.05); *H02M 1/008* (2021.05); *H02M 3/01* (2021.05); *H02M 3/158* (2013.01); *H02M 3/1582* (2013.01); *H02M 3/33546* (2013.01); *H02M 3/33561* (2013.01); *H02M 3/33576* (2013.01); *H02M 3/33584* (2013.01); *Y02B 70/10* (2013.01)

(56) References Cited

U.S. PATENT DOCUMENTS

| | | | |
|---|---|---|---|
| 2015/0117063 A1* | 4/2015 | Rivet | H03K 3/012 327/109 |
| 2016/0020701 A1* | 1/2016 | Jitaru | H02M 3/33546 363/16 |

* cited by examiner

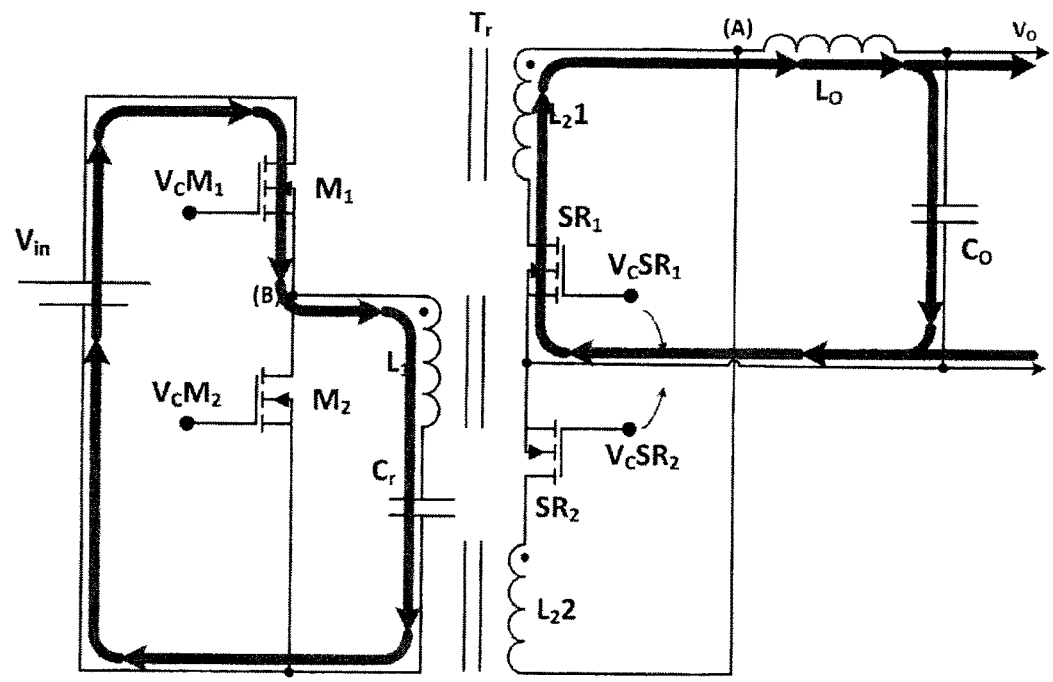
FIGURE 5A   $t_0 - t_1$
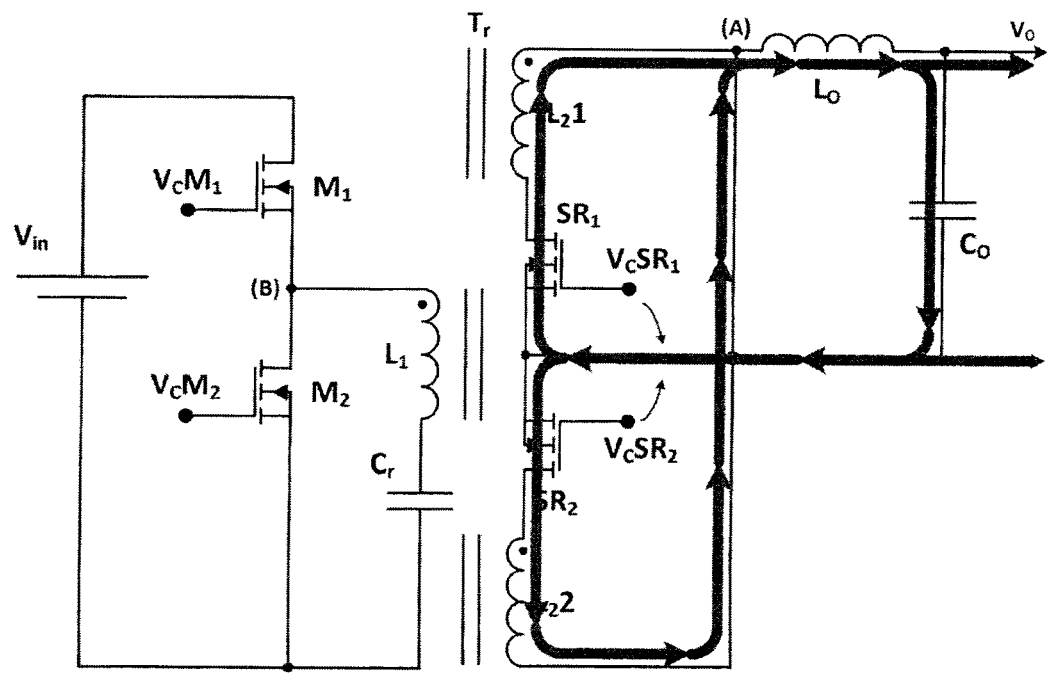
FIGURE 5B   $t_1 - t_2$

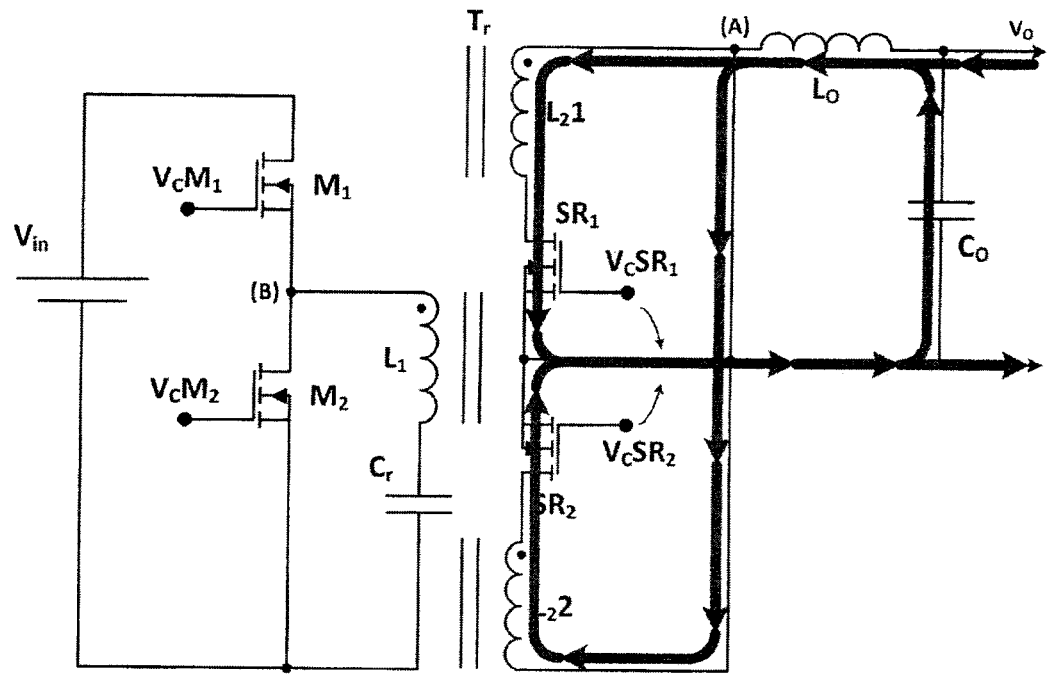
FIGURE 5C  $t_2 - t_3$
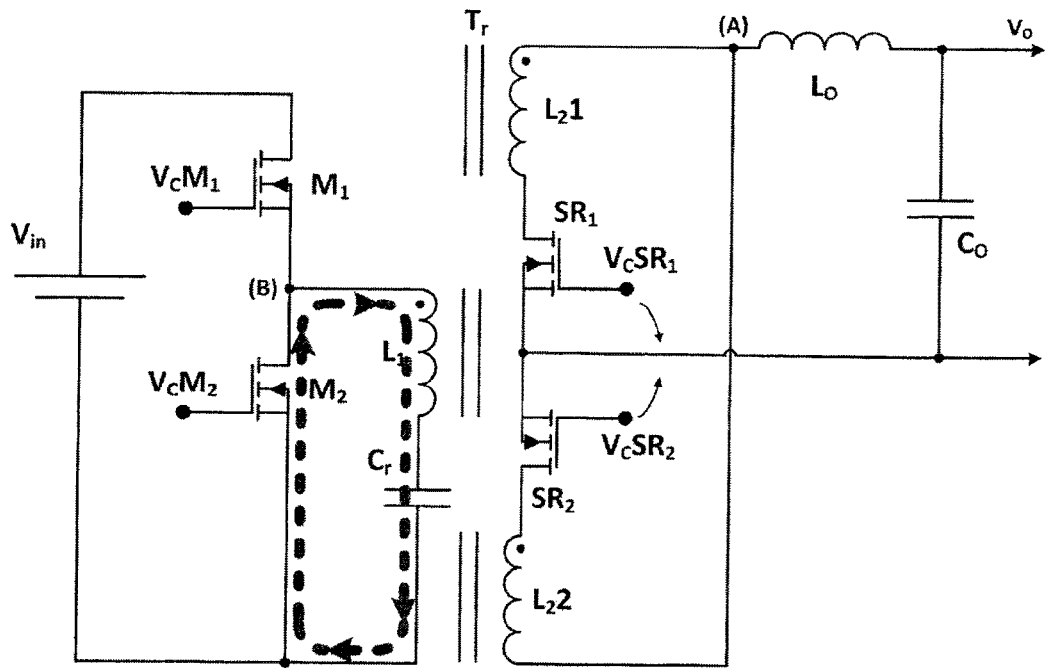
FIGURE 5D  $t_3 - t_4$

VERY HIGH EFFICIENCY SOFT SWITCHING CONVERTER AKA THE ADJUD CONVERTER

RELATED APPLICATION/CLAIM OF PRIORITY

This application is a continuation of and claims the benefit of prior U.S. patent application Ser. No. 17/228,462, filed Apr. 12, 2021, which is a continuation of and claims the benefit of prior U.S. patent application Ser. No. 16/989,812, filed Aug. 10, 2020, which is a continuation of and claims the benefit of prior U.S. patent application Ser. No. 15/627,832, filed Jun. 20, 2017, which is related to and claims the priority of Provisional Application No. 62/352,411, filed Jun. 20, 2016, and entitled Very High Efficiency Soft Switching Converter AKA the Adjud Converter, all of which are incorporated by reference herein.

1. INTRODUCTION

The present invention relates to a new technology which can be implemented in standalone DC-DC Converters or DC-DC Converters as part of an AC-DC Converter which can operate over a large input and output voltage range and provide very high efficiency. This technology is highly suitable with multiple independent outputs. The converter which converters the power from the primary side to the secondary side across the isolation boundary is referred in this invention as isolated converter. The goal for the isolated converter is to be very efficient and suitable for very high frequency operation in order to reduce the size of the magnetics and capacitive storage elements. High efficiency at high frequency operation does require soft switching, which means that the primary switchers shall turn on at zero voltage switching conditions. For the secondary switchers, referred in this patent application as synchronized rectifiers, for soft switching operation the turn off shall be done at zero or slight negative current. In addition to zero voltage switching conditions for the primary switchers the voltage across the synchronous rectifiers has to rise in a monotonic way without ringing and spikes in order to define a topology as a true soft switching, and this technology does accomplish that unlike other soft switching topologies form the prior art.

To meet the requirements for very high efficiency at lighter load the switching frequency of the isolated converter should be able to decrease as the load decreases and should be able to decrease also the on time for the primary switchers, decreasing the magnetic flux through the transformer and as a result the core loss. This flexibility in changing the frequency of operation and the on time for the primary switchers shall not interfere with maintaining zero voltage switching conditions on all the switching elements regardless of the input and output voltage and loading conditions. During the time the primary switchers are on the energy is transferred from primary to secondary. Reducing the on time for the primary switchers reduces the amount of energy transferred to the secondary. To further reduce the energy transfer to the secondary and keep the bias power low, the repetition frequency shall decrease as well for light load operation. The time interval between the on time of the primary switchers is referred in this application as dead time. In this invention during the dead time a low impedance path is offered to the magnetizing current of the transformer in order to flow and maintain its amplitude. This is done in the secondary by turning on both synchronized rectifiers.

An important feature of the technologies presented in this invention is to be suitable with multiple outputs even if the transformer will use only one main secondary winding. The control of the switching elements should comply with the Power Delivery Specification version 2.0 for at least two USB 3.1 ports. This new USB specification is aimed at reducing the types of power supplies used for computing devices. It allows multiple output voltages and currents based on a negotiating procedure. This allows power supplies complying with the new specification to be used universally, which promotes reuse and reduces waste. The old USB standard has been used in this way and has been mandated in several countries, the new specification expands on this universal use by allowing multiple voltages on the USB bus. This is needed since most laptop computers consume more than low which is what the old USB standard allowed. By allowing higher voltage more power can be delivered on the new 3A rated cable and connector.

The efficiency of the converter is always a major consideration and now with more restrictive specifications at light load the efficiency at all load conditions is very important. The difficulty in providing low power at light loads is complicated further by having two or more independent outputs.

This disclosure provides a set of technologies that are aimed on complying with all these new requirements while maximizing the efficiency over the entire range of operation.

In the prior art there is a circuit comprising an off line isolated converter followed by one or more post regulators, function of the number of outputs. The isolated converter has a regulated output voltage that can be changed and wherein determination of the regulated output voltage of the isolated converter is based on the output voltage(s) of the outputs. This concept is described in details in U.S. provisional application Ser. Nos. 62/152,722 and 62/189,150, both of which are incorporated by reference herein.

SUMMARY OF THE INVENTION

Summary of the Present Invention

In this application we are not using post-regulators as is done in the mentioned prior art. The isolated converter incorporates the function of regulating the output voltages and the isolated converters may change the mode of operation to meet the requirements for all the outputs. The power processing efficiency it is much higher in this technology than the methodology used in the prior art.

In this application we are describing several topologies wherein the primary switchers are turning on at zero voltage conditions and the secondary synchronized rectifiers are turning off at zero or slight negative current, and have the voltage across them rise in a monotonic way without spikes and ringing. The soft switching operation is maintained over the entire input voltage range and all the loading conditions. These topologies are also suitable with high efficiency operation at light load by decreasing the repetition frequency and by reducing the core loss in the magnetic core through the reduction of the on time of the primary switchers.

Traditionally, the flyback topology is used for the isolated converter in AC-DC adapters. Flyback topology it is simple and can work relatively efficient over a large input voltage range. In applications wherein the output voltage has to vary between 5V to 20V such is the case in the class C USB the regulation for the output voltage is done by a post regulator. The overall efficiency is the product of the efficiency of the isolated converter and the post regulator. As a result the overall efficiency is lower than the efficiency of each stage.

The performances of the flyback topology have been recently increased by harvesting the energy contained in all the parasitic elements such as the leakage inductance and the parasitic capacitance across the switching device which were described in U.S. application Ser. No. 14/274,598 and U.S. application Ser. No. 14/933,476, both of which are incorporated by reference herein.

In spite of these improvements the efficiency of the flyback topology it is still limited due to the efficiency of the transformer. Combining the energy transfer from primary to secondary together with the energy storage in the same isolated transformer does limit the efficiency in the transformer. In many AC-DC applications of power levels under 70 W the flyback transformer efficiency it is in the range of 96-97%.

In this patent application the energy is transferred from the primary to secondary in a forward mode increasing significantly the efficiency of the transformer. The power processing and the energy storage for the regulation of the output voltage (s) is done in the secondary side. The general concept is depicted symbolically in FIG. 1.

Other features of the present invention will become further apparent from the following detailed description and the accompanying drawings.

BRIEF DESCRIPTION OF THE DRAWINGS

FIG. 5A depicts the current flow from t0-t1 in the forward derived, critical conduction soft switching half bridge mode of operation FIG. 5B depicts the current flow from t1-t2 in the forward derived, critical conduction soft switching half bridge mode of operation FIG. 5C depicts the current flow from t2-t3 in the forward derived, critical conduction soft switching half bridge mode of operation FIG. 5D depicts the current flow from t3-t4 in the forward derived, critical conduction soft switching half bridge mode of operation

DETAILED DESCRIPTION

Figure 1:
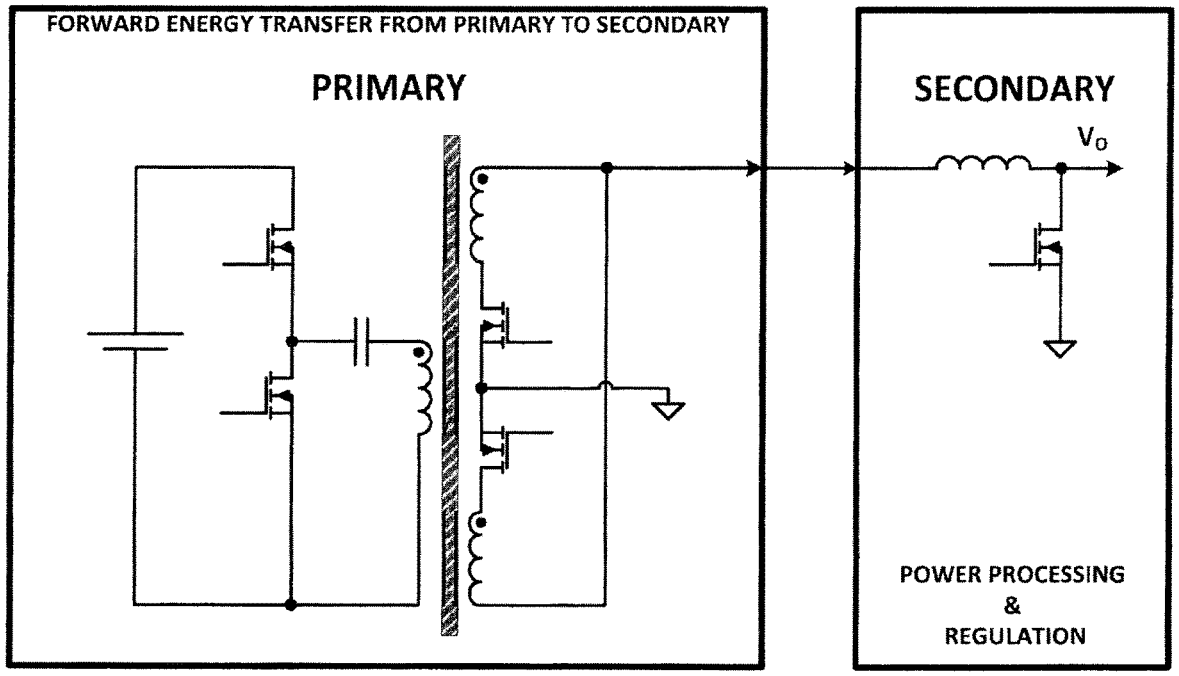
FIG. 1 depicts the core concept of this invention in two functional blocks.

As discussed above, in the prior art there is a circuit comprising an off line isolated converter followed by one or more post regulators, function of the number of outputs. The isolated converter has a regulated output voltage that can be changed and wherein determination of the regulated output voltage of the isolated converter is based on the output voltage(s) of the outputs. This concept is described in details in U.S. provisional application Ser. Nos. 62/152,722 and 62/189,150, both of which are incorporated by reference herein.

In this application we are not using post-regulators as is done in the mentioned prior art. The isolated converter incorporates the function of regulating the output voltages and the isolated converters may change the mode of operation to meet the requirements for all the outputs. The power processing efficiency it is much higher in this technology than the methodology used in the prior art.

In this application we are describing several topologies wherein the primary switchers are turning on at zero voltage conditions and the secondary synchronized rectifiers are turning off at zero or slight negative current, and have the voltage across them rise in a monotonic way without spikes and ringing. The soft switching operation is maintained over the entire input voltage range and all the loading conditions. These topologies are also suitable with high efficiency operation at light load by decreasing the repetition frequency and by reducing the core loss in the magnetic core through the reduction of the on time of the primary switchers.

Traditionally, the flyback topology is used for the isolated converter in AC-DC adapters. Flyback topology it is simple and can work relatively efficient over a large input voltage range. In applications wherein the output voltage has to vary between 5V to 20V such is the case in the class C USB the regulation for the output voltage is done by a post regulator. The overall efficiency is the product of the efficiency of the isolated converter and the post regulator. As a result the overall efficiency is lower than the efficiency of each stage.

The performances of the flyback topology have been recently increased by harvesting the energy contained in all the parasitic elements such as the leakage inductance and the parasitic capacitance across the switching device which were described in U.S. application Ser. No. 14/274,598 and U.S. application Ser. No. 14/933,476, both of which are incorporated by reference herein.

In spite of these improvements the efficiency of the flyback topology it is still limited due to the efficiency of the transformer. Combining the energy transfer from primary to secondary together with the energy storage in the same isolated transformer does limit the efficiency in the transformer. In many AC-DC applications of power levels under 70 W the flyback transformer efficiency it is in the range of 96-97%.

In this patent application the energy is transferred from the primary to secondary in a forward mode increasing significantly the efficiency of the transformer. The power processing and the energy storage for the regulation of the output voltage (s) is done in the secondary side. The general concept is depicted symbolically in FIG. 1.

In FIG. 1 the energy is transferred in a forward mode across the boundary from primary to secondary in a very efficient way with the efficiency which can be as high as 98-99%. This is due mostly to the high efficiency of the forward type transformer which can have efficiency well above 99%. The second stage it is not an independent post regulator, but part of the isolated converter. The overall efficiency in this invention can be 97-98%, while the flyback topology without the post regulator can provide and efficiency of approximate 95% in the most optimized flyback topology. If the efficiency of the post regulator is 98%, the overall efficiency of the DC-DC Converter is 93%.

The isolated converter in this invention can be a single ended forward or a double ended topology as half bridge and full bridge. The double ended topologies may lead to a smaller and a more efficient transformer In one of the preferred embodiment the isolated converter is a half bridge topology. This half bridge topology has to be a soft switching half bridge topology. In US application "Soft Switching Converter by Steering the Magnetizing Current", application Ser. No. 14/274,701 which is incorporated by reference herein (and a copy of that application is exhibit A hereto) is described the soft switching half bridge topology wherein the soft switching properties are obtained by ensuring that the magnetizing current it is higher than the output current prior the primary switchers will turn off.

Figure 2:
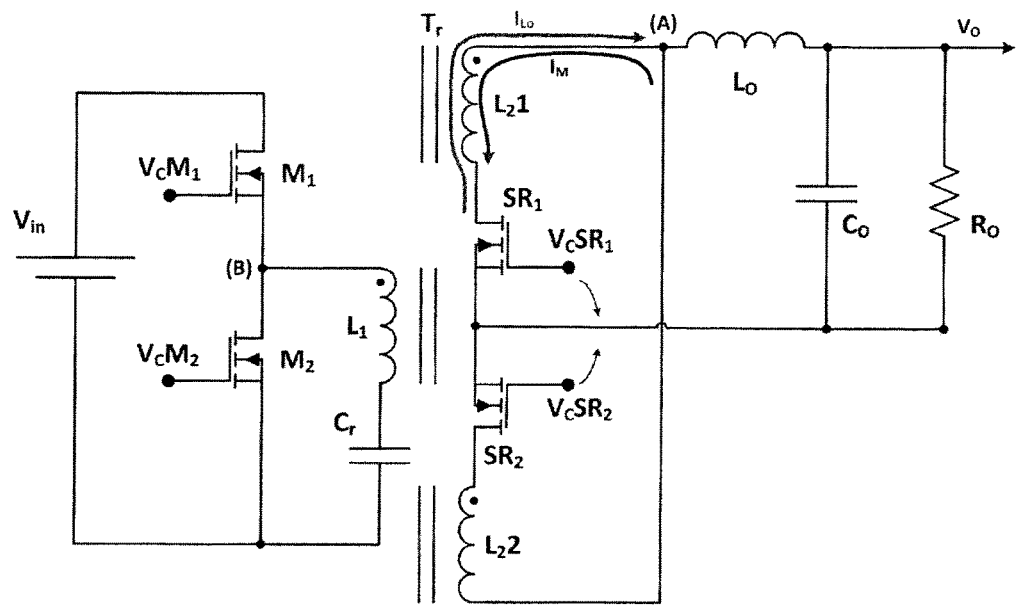
FIG. 2 depicts the basic schematic of a standard half bridge topology with center tap and output filter.
Figure 3:
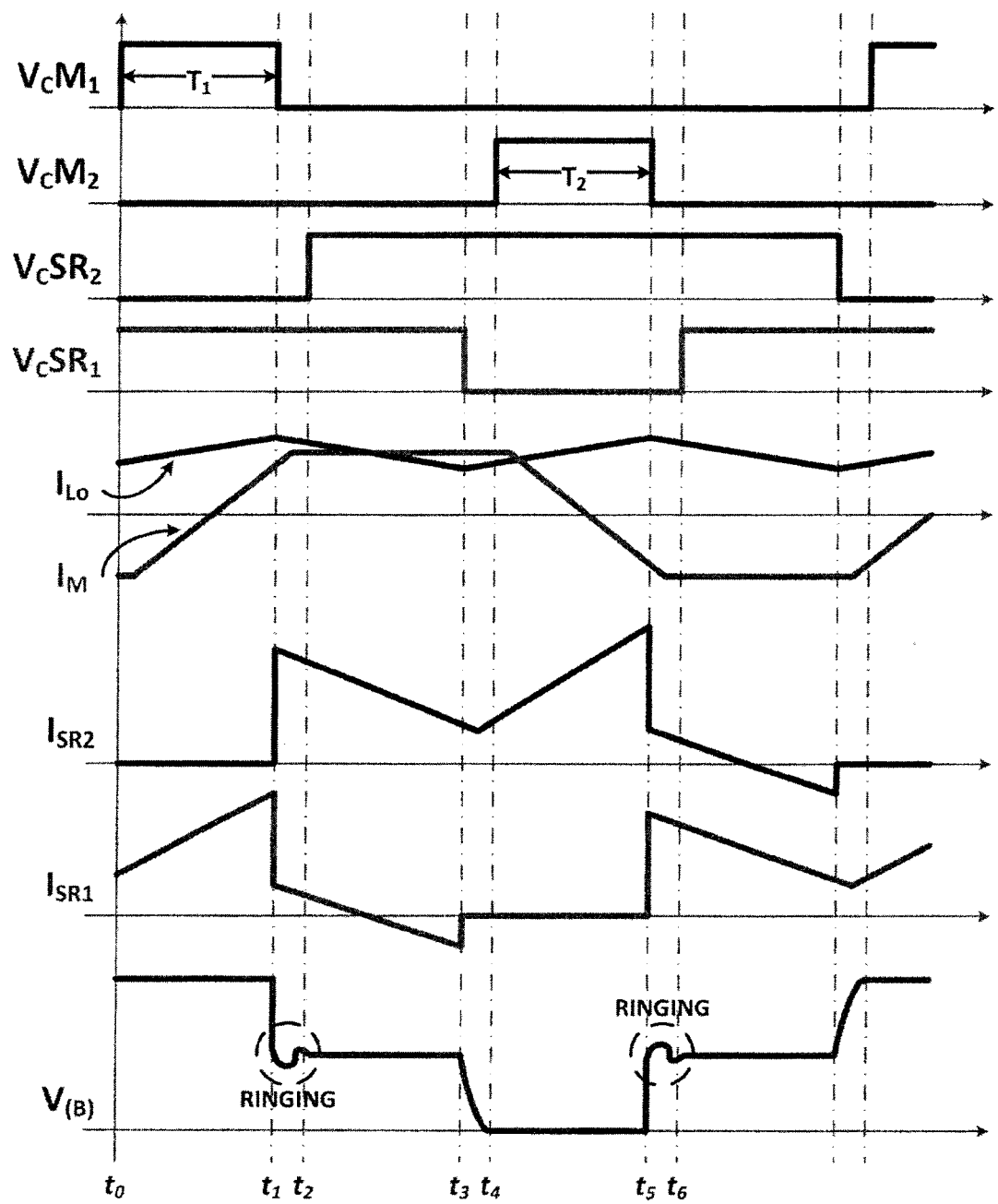
FIG. 3 depicts the key waveforms for soft switching operation of the half bridge depicted in FIG. 2

In FIG. 2 is presented a standard half bridge topology and in FIG. 3 are presented the key waveforms for a soft switching half bridge topology described in U.S. patent application Ser. No. 14/274,701 which is incorporated by reference herein (and a copy of that application is Exhibit A hereto).

In FIG. 3 are presented the key waveforms associated with the half bridge topology depicted in FIG. 2. The key waveforms are: VcM1, which is the control signal form M1, VcM2, which is the control signal for M2, VcSR1 which is the control signal form SR1, VcSR2 which is the control signal for SR2, $I_{Lo}$, which is the current through the output inductor Lo, $I_M$, which is the magnetizing current through the transformer Tr, $I_{SR2}$, which is the current through synchronous rectifier SR2, $I_{SR1}$, which is the current through the synchronous rectifier SR1 and V(B) which is the voltage in the switching node B.

At time t0, the upper switch M1 is turned on. The magnetizing current will build up through the transformer from a negative level to a positive level. Between t0 to t1 also the current through the output inductor will build up from a lower level at to a higher level at t1. During the time interval t0 to t1 the energy is transferred from the primary to the secondary in a forward mode while additional energy is stored in Lo. The current through SR1 and SR2 is the summation of the current flowing through Lo and the magnetizing current.

At time t1, the primary switch M1 will turn off. The voltage in switching node B will start decaying towards the voltage across Cr. In the steady state operation and wherein the conduction time for M1 and M2 is equal, the voltage across Cr is half of the input voltage. At t1 there is a current flowing through the transformer primary winding which is the summation between the magnetizing current and the current through Lo reflected in the primary by the turn ratio of the transformer. This current flows through the leakage inductance of the transformer storing energy in the leakage inductance. The leakage inductance reflected in the primary will resonate with the parasitic capacitance of M1, M2 and the primary capacitance of the transformer. This ringing is described in FIG. 3 and it occurs after t1. The energy contained in the leakage inductance of the transformer will be mostly dissipated.

At time t2, SR2 is turned on and from t2 to t3 both synchronous rectifiers SR1 and SR2 are conducting creating a short circuit across the secondary windings. The magnetizing current will flow into the secondary through the low impedance created by SR1 and SR2 maintaining its amplitude as depicted in FIG. 3. By design, the amplitude of the magnetizing current is made to be higher than the amplitude of the output current by the end of the time interval t2 to t3. The current through SR1 represents the difference between the current flowing through Lo and the magnetizing current and as a result the current through SR2 will become negative prior the t3. The magnetizing current amplitude at t3, as depicted in FIG. 3, is larger than the current through Lo at that time which is the key condition to achieve zero voltage switching. This condition it is necessary to ensure that the half bridge topology presented in FIG. 2 operates in a soft switching mode. To be able to achieve this condition under all the input voltages and the loading conditions the sizing of the magnetizing inductance has to be properly tailored and the frequency of operation and the on time of the primary switchers may have to change function of the input voltage and loading conditions. For example at higher load, the on time for M1 and M2 shall increase and in order to maintain the output voltage regulation the repetition frequency has to decrease accordingly. A larger on time for the primary switchers will increase the amplitude of the magnetizing current while decreasing the repetition frequency by increasing the dead time period when neither of the primary switching elements conducts will decrease the current amplitude through the output choke Lo at t3. Operation in soft switching mode means that the primary switchers do turn on under zero voltage switching conditions.

At t3 the synchronous rectifier SR2 which at that time conducts a current with zero or a negative polarity, turns off. By turning off SR1, the short circuit created by the simultaneous conduction of SR1 and SR2 is opened and the magnetizing current it is pushed towards the primary discharging the parasitic capacitances across M1 and M2, and creating zero voltage switching conditions for M2 at t4. The magnetizing current will also charge the parasitic capacitance across SR1 to the voltage level dictated by the turn ratio of the transformer. The voltage across SR1 will be built up in a monotonic way without ringing and spikes, because the charge of the parasitic capacitance across SR1 is done by a current source, which is the magnetizing current. In this technology wherein the voltage transition across the switching elements including the synchronous rectifier is done by a current source, the voltage rise is done in a monotonic way without spikes and ringing. A voltage ringing across a switching device at turn off it is not possible if the current which flows into the parasitic capacitance of the switching device is done by a current source because the current source by definition is maintaining a constant current which will prevent current spikes and ringing. This is one of the key advantages of this technology in comparison with prior art. Allowing the magnetizing current to do the voltage transition across the primary and secondary switching elements it is a key embodiment of this invention. Soft transition is accomplished in this topology regardless of how small the leakage inductance of the transformer may be which is totally different from other zero voltage switching technologies described in the prior art. In this technology we do not obtain only zero voltage switching across the primary switching elements but also we do have a soft transition across the synchronous rectifiers in the secondary without voltage ringing and spikes across it when the synchronous rectifiers turns off. This has a big advantage for choosing a synchronous rectifier with lower voltage rating without the concern associated with the voltage spikes across it. That will also help reducing the noise in the converter and also reducing the EMI. In this technology the soft commutation it is originated from the secondary by turning off the synchronous rectifier while the current through the synchronous rectifier was zero or negative, and turning on the primary snitchers later after the voltage across the primary switchers reach a low voltage level or zero. In between t3 to t4 the capacitances across the primary switchers are discharged by the magnetizing current towards zero creating zero voltage switching condition for M2 at t4.

At t4, M2 is turned on at zero voltage across it. Between t4 and t5 M2 is conducting and the magnetizing current will change the polarity from a positive level to a negative level. Between t4 and t5 the energy is transferred in a forward mode from the primary towards the secondary through Lo while storing additional energy in Lo. The current through Lo is increasing form the low level at t3 to a high level at t5.

At time t5, the primary switch M2 will turn off. The voltage in switching node B will start increasing towards the voltage level across Cr. The leakage inductance reflected in the primary will resonate with the parasitic capacitance of M1, M2 and the primary capacitance of the transformer. This ringing is described in FIG. 3 after t5. The energy contained in the leakage inductance of the transformer will be mostly dissipated.

At time t6 SR1 is turned on and as a result bother synchronous rectifiers will conduct creating a short circuit across the secondary windings. This will create a low impedance path for the magnetizing current which will flow into the secondary maintaining its amplitude during the time both SR1 and SR2 conduct. After that the cycles will repeat.

To ensure zero voltage switching conditions across the primary switchers the magnetizing current has to exceed the amplitude of the current flowing through Lo at the time when the synchronous rectifiers turn off. When this condition is met the current though the synchronous rectifiers is zero or negative. When the synchronous rectifiers are turned off the short circuit across the secondary winding is removed and the magnetizing current will start discharging the parasitic capacitance across the primary switchers and charge the parasitic capacitance of the synchronous rectifier which is turned off. This will create zero voltage switching across the primary switchers and will create a monotone rise for the voltage across the synchronous rectifier without spikes and ringing.

The half bridge topology operating in the mode previously presented will be further referred in this patent application as "loaded soft switching half bridge operation mode". This mode of operation is referred as loaded soft switching because the half bridge operated in a continuous mode, wherein the current through the output inductor Lo does not reach zero level prior the turn off of the synchronous rectifiers. As mentioned previously this mode of operation was introduced in U.S. patent application Ser. No. 14/274,701 (Exhibit A hereto).

Figure 4A:
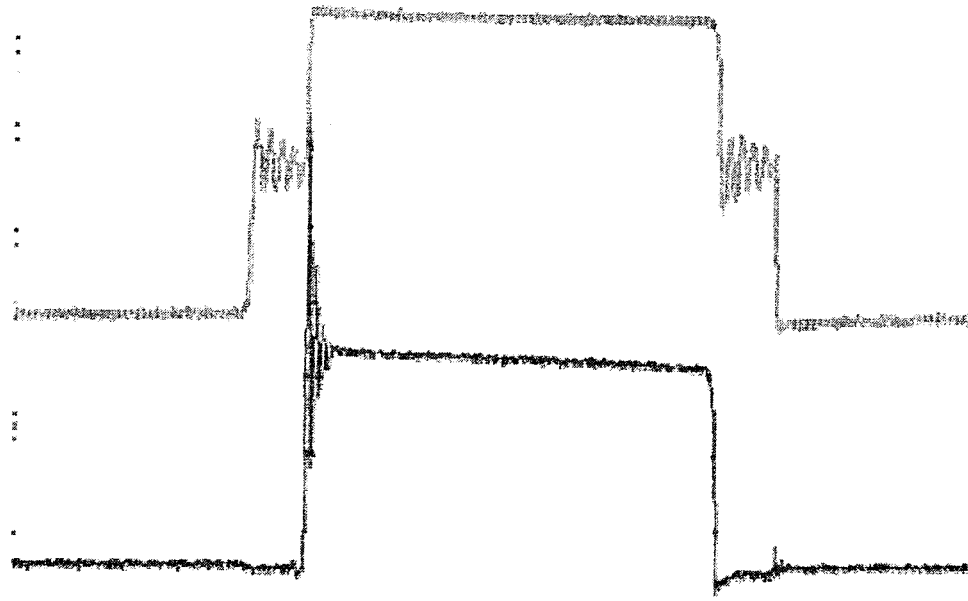
FIG. 4A depicts the drain to source voltage across the primary switchers and the voltage across the synchronous rectifier of a half bridge operating in hard switching mode
Figure 4B:
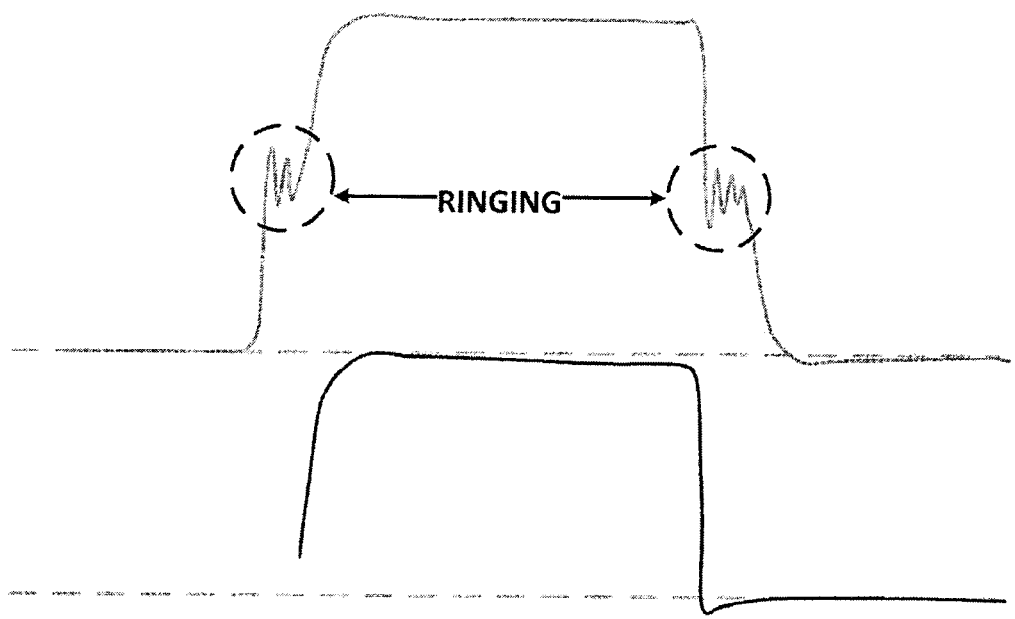
FIG. 4B depicts the drain to source voltage across the primary switchers and the voltage across the synchronous rectifier of a half bridge operating in soft switching mode described in FIG. 3

In FIG. 4A is depicted the voltage in the switching node B of FIG. 2 and the voltage across SR2 when the half bridge operates in hard switching mode. As depicted in FIG. 4A there is a large voltage spike across the synchronous rectifier and the ringing associated with that transition. Hard switching mode is a standard operation in the half bridge topology wherein the primary switchers are turning on when the voltage across them is higher than zero. When the primary switchers turn on in hard switch mode, the voltage across of the synchronous rectifier which is forcefully turned off has a large voltage spike and ringing. This is due to the resonance between the leakage inductance of the transformer and the parasitic capacitance of the synchronous rectifier. The initial voltage spike will reach typically twice the voltage across the synchronous rectifier in the steady state mode after the ringing across the synchronous rectifier is damped out. This is one of the major drawback of the prior art half bridge topology. In FIG. 4B are depicted the same waveforms as in FIG. 4A in the "loaded soft switching half bridge operation" wherein the primary switchers are turned on at zero voltage and the voltage across synchronous rectifiers is built up in a monotonic way without spikes and ringing by the magnetizing current. The discharge of the parasitic across the primary switchers is done by the magnetizing current in the transformer. In FIG. 4B. are the same waveforms as FIG. 4A but in soft switching mode of operation. As can be seen there is a soft transition in B when the upper switch M1 turns on and the same applies when the lower switch M2 turns on. Unlike FIG. 4A, the voltage across the synchronous rectifier will rise in a monotonic way without ringing and spikes. However, as depicted in FIG. 4B we still have a ringing in the switching node B during the dead time when the primary switchers turn off That is due to the resonance between the leakage inductance and the parasitic capacitances of the primary switchers and the capacitance of the transformer. The energy contained in the leakage inductance is $(Lk*Ipk^2)/2$, wherein the Lk represents the leakage inductance reflected in the primary and the Ipk represents the current through the primary switchers, M1 and M2 at turn off. A good portion of that energy is dissipated. In order to minimize this power loss we need to keep the leakage inductance low and we need to decrease the peak current through the primary switchers at turn off. In the "loaded soft switching half bridge operation mode" this is not easy to accomplish because the magnetizing current reflected to the secondary has to be larger than the current through the output inductor at the time when the synchronous rectifiers are turned off. The current through the primary switchers are triangular starting from a small negative current towards a peak current at the time when the primary switchers turn off. In this invention we are offering several solutions in addressing this drawback associated with the "loaded soft switching half bridge topology". In the "loaded soft switching half bridge operation mode" the magnetizing current has to be relatively high and as a result there will be additional losses due to the conduction losses associated with the magnetizing current, besides of the energy contained in the leakage inductance which will be mostly dissipated. One way to decrease the amplitude of the magnetizing current is to allow the current through Lo to reach zero current level before the synchronized rectifiers are turned off Such a mode of operation is referred in this patent as "critical conduction soft switching half bridge operation mode".

Critical Conduction Soft Switching Half Bridge Mode of Operation

At t0 the primary switch M1 is turned on, as depicted in FIG. 5A, the current will flow from the primary source, Vin, through M1, the primary winding of the transformer Tr and Cr. In the secondary a voltage will be induced with a positive voltage at the dot and the current will flow through SR1, Lo, Co and towards the output load. Between t0 to t1 the current through Lo will ramp up from zero to a peak level. In the same time period the magnetizing current will ramp from a negative level towards a positive level of the same amplitude.

At t1, the primary switch will turn off. With the exception of the ringing between the leakage inductance in the primary and parasitic capacitance across the primary switchers and the parasitic capacitance of the transformer there is not a current flow in the primary. In the secondary, as depicted in FIG. 5B the current will flow through SR1 and SR2, which are both on through the output inductor Lo. Between t1 and t2 the voltage in the switching node 'A': is zero and the current in Lo will decay towards zero. The current flowing through SR1 it is a superposition of the current flowing through Lo and the magnetizing current which between t1 and t2 will have a polarity flowing into the drain of SR1 which will subtract from the current flowing through Lo.

At t2, the current through t2 will reach zero which means that the amplitude of the current through Lo will be equal with the amplitude of the magnetizing current. After that condition is met the synchronous rectifier SR1 may turn off or may conduct further for a short period of time until t2.

At t3 the synchronous rectifier SR1 will be turned off. The magnetizing current will reflect into the primary and will discharge the parasitic capacitances across the primary switchers and the transformer and charge the parasitic capacitances across SR1.

At t4 the voltage across the M2 reaches zero and the primary switch M2 will be turned on under zero voltage switching conditions.

In this mode of operation the magnetizing current can have a much lower value and minimize in this way the additional conduction losses. However, the frequency of operation will change with loading and get very high at lighter load. The maximum frequency of operation at light load can be limited by increasing the amplitude of the negative current through synchronous rectifiers though that will lead to higher circulating currents between primary and secondary and may negatively impact the efficiency.

Unloaded Soft Switching Half Bridge Mode of Operation

Figure 7:
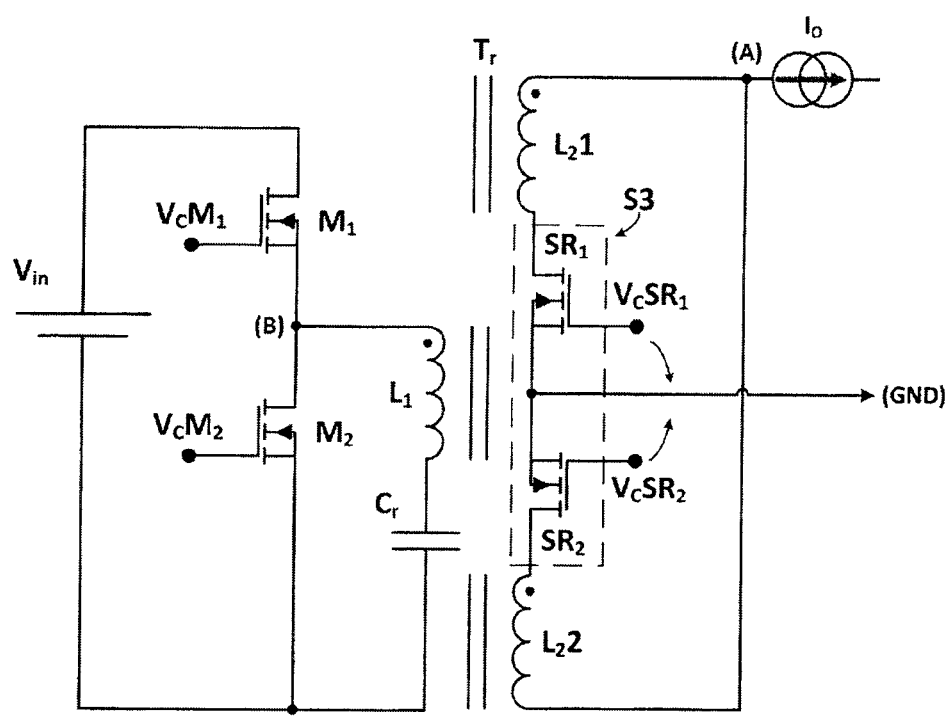
FIG. 7 depicts the basic schematic of a half bridge with center tap with synchronized and controlled shape output current

In FIG. 7 is presented the basic cell for the topologies which will be presented in this patent application.

Io it is a current source which shape is determined by different configurations representing different embodiments, current source which is synchronized with the half bridge.

Function of the Current Demanded by the Current Source to, we can Define Several Modes of Operation.

The first mode of operation will be "unloaded soft switching half bridge" and this applies when the current demanded by Io is zero. The key properties of this mode of operation will be reproduced in different embodiments of this invention wherein the current is not zero but shaped to become zero at specific times.

Figure 8:
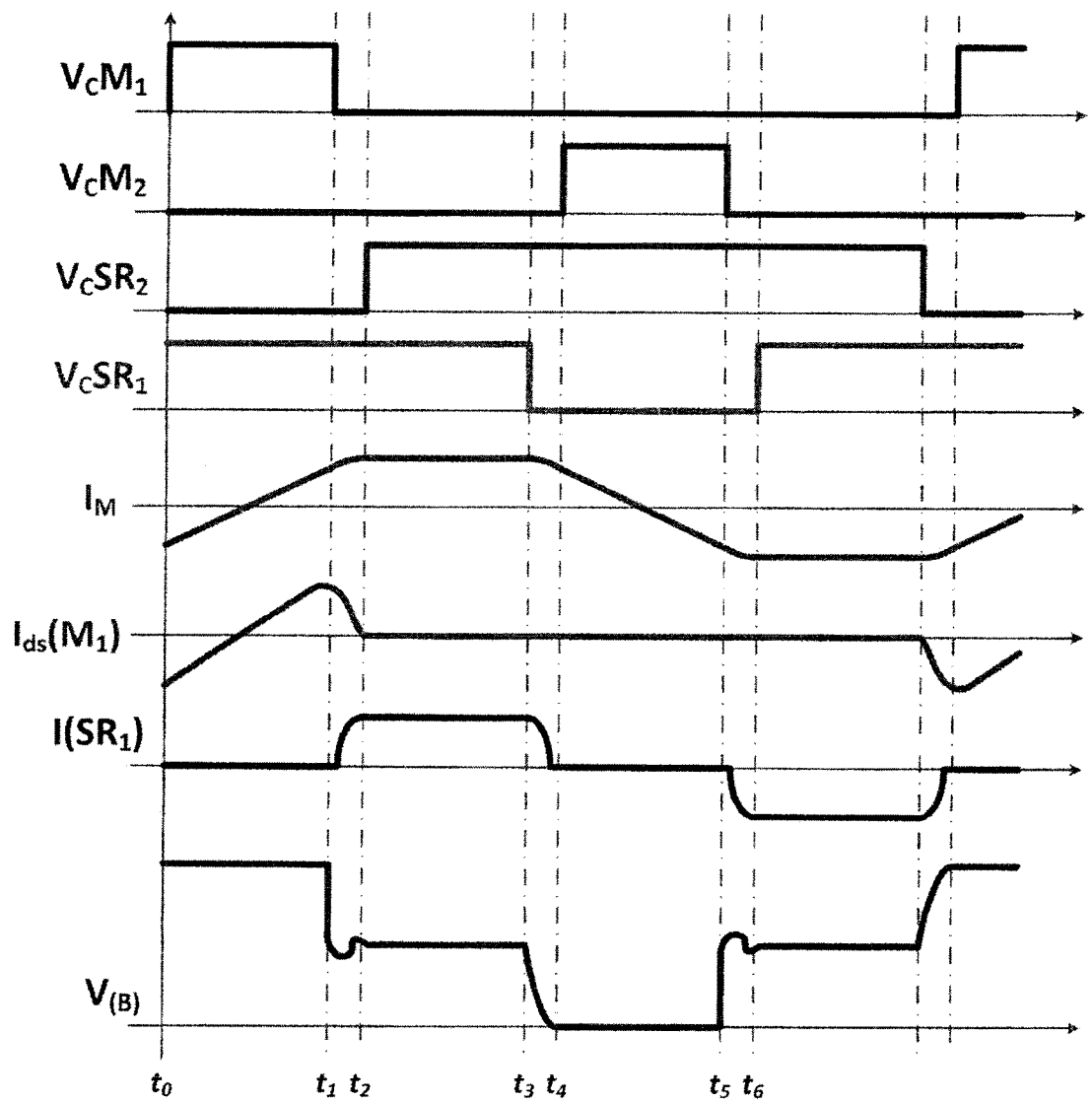
FIG. 8 depicts the key waveforms of the topology depicted in FIG. 7 wherein the output current is zero, "unloaded mode".

The mode of operation it is described in FIG. 8. In FIG. 8 are presented the key waveforms of the circuit described in FIG. 7, VcM1, the control signal for M1, VcM2, the control signal for M2, VcSR2, the control signal for SR2, VcSR1, the control signal for SR1, IM, the magnetizing current, Ids(M1), the current through M1, I(SR1), the current through SR1, V(B), the voltage in the switching node B.

In FIG. 7 S3 represents the combined SR1 and SR2 to underline the fact that during the dead time when the primary switchers M1 and M2 are off both synchronized rectifiers SR1 and SR2 are in conduction creating a short circuit across the secondary windings.

At t0, the primary switch M1 turns on and the magnetizing current ramps up from a negative level to a positive level of the same amplitude. The current through the primary switch which is the superposition of the output current reflected to the primary and the magnetizing current will represent just the magnetizing current because the output current is zero.

At t1, the primary switch M1 turns off and the magnetizing current which was flowing through the primary switch will start discharging the parasitic capacitances of the primary switchers and the parasitic capacitance of the transformer. The voltage in switching none B will be swinging towards the voltage across Cr, which in steady state has a voltage across it of value half of the input voltage considering a total symmetrical operation wherein the on time for the primary switchers are equal. There will be a ringing in the switching node B caused by the resonance between the leakage inductance and the parasitic capacitances of the primary switchers and the parasitic capacitance of the transformer.

At t2, the SR2 will be turned on. In between t2 and t3 both synchronous rectifiers, SR1 and SR2 are conducting creating a short circuit for the magnetizing current which will maintain its amplitude during this time interval.

At t3 SR1 will be turned off. The magnetizing current will start discharging the parasitic capacitances of the primary switchers and the transformer and in the same time charge the parasitic capacitance of SR1 in a monotonically without spikes and ringing. The voltage across M2 will decrease in a monotonic way towards zero creating zero voltage switching condition for M2 at t4. The most important aspect of this mode of operation is the fact that the magnetizing current will act as an ideal current source and it will always discharge the parasitic capacitances across the switchers towards zero voltage and regardless of its amplitude. A smaller amplitude magnetizing current will take longer time to discharge the parasitic capacitances. As a result there is a trade off in between the amplitude of the magnetizing current and the time interval the transition is done which in this case is t3 to t4.

At t4 the primary switch M2 is turned on. The magnetizing current will start ramping down form a positive level to a negative level of the same amplitude.

At t5 the primary switch M2 is turned off and the voltage will start increasing rapidly across it function of the value of the magnetizing current which was flowing through it at t5 and the parasitic capacitance across the primary switchers, transformer and the parasitic capacitance of SR2 reflected in the primary. The amplitude of the magnetizing current will determined the amplitude of the ringing across the M2. To minimize the ringing we need to keep the magnetizing current low.

In this mode of operation, wherein the amplitude of the current source is zero, zero voltage switching conditions across the primary switchers is always accomplished and the voltage across the secondary synchronous rectifiers will always have a monotonic rise without spikes and ringing. There will be however ringing in the switching node B when the primary switchers turn off. The amplitude of this ringing it is proportionate with the magnetizing current amplitude. By design we choose an amplitude for the magnetizing current which will accomplish the discharge of the parasitic capacitances across the primary switchers in a given time interval and keep the ringing in the node B to an acceptable level. Keeping the magnetizing current at a low level will decrease the energy in the leakage inductance and increase the efficiency.

Figure 4C:
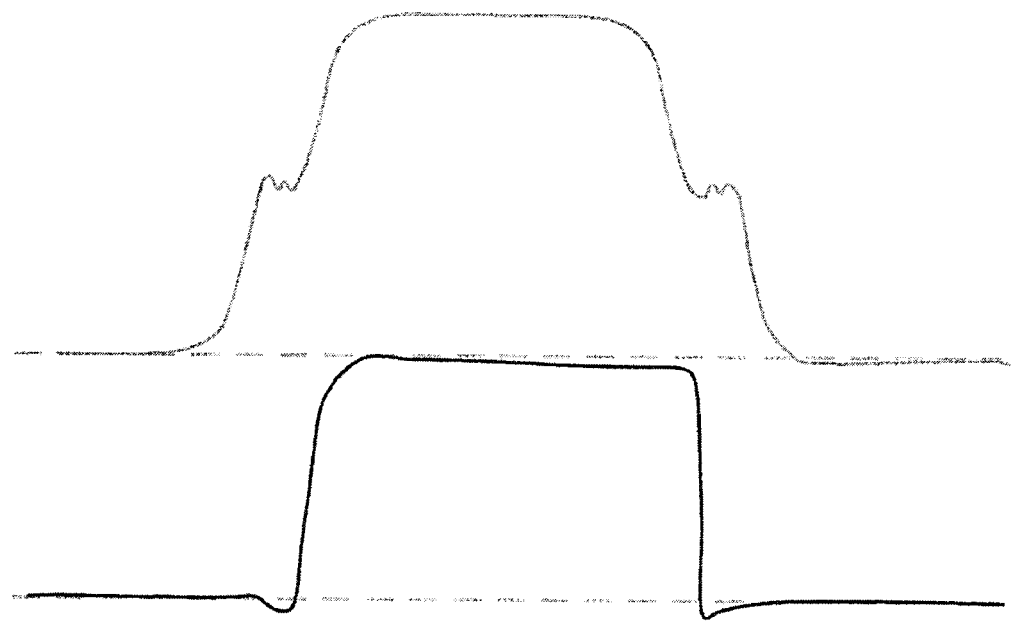
FIG. 4C depicts the drain to source voltage across the primary switchers and the voltage across the synchronous rectifier of an unloaded or timely loaded soft switching half bridge which represents key embodiments of this invention.
Figure 6:
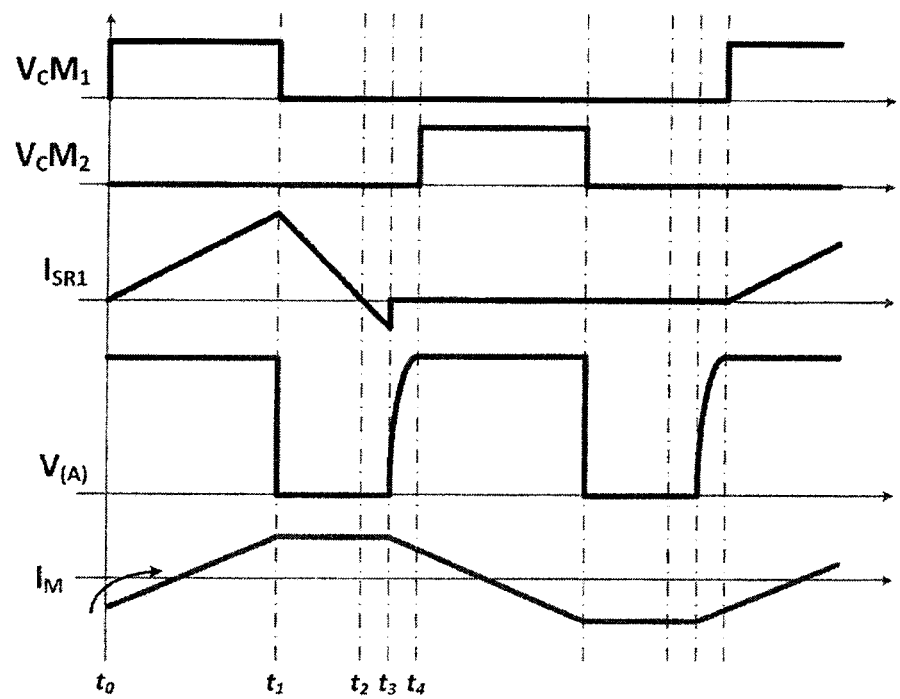
FIG. 6 depicts the key waveforms in the forward derived, critical conduction soft switching half bridge mode of operation

In FIG. 4C is presented the voltage in the switching node B and the voltage across the synchronized rectifier in such a mode of operation wherein the amplitude of the magnetizing current is low. As can be seen in FIG. 4C the amplitude of the ringing during the dead time it is smaller than the ones in FIG. 4B, wherein we have a larger amplitude magnetizing current.

Unloaded Soft Switching Half Bridge Operating in Critical Mode

In order to eliminate the ringing in the switching node B and recycle the energy contained in the leakage inductance we introduce the following mode of operation named "unloaded soft switching half bridge operating in critical mode". In this concept the dead time between the primary switchers is reduced to the transition time.

Figure 9:
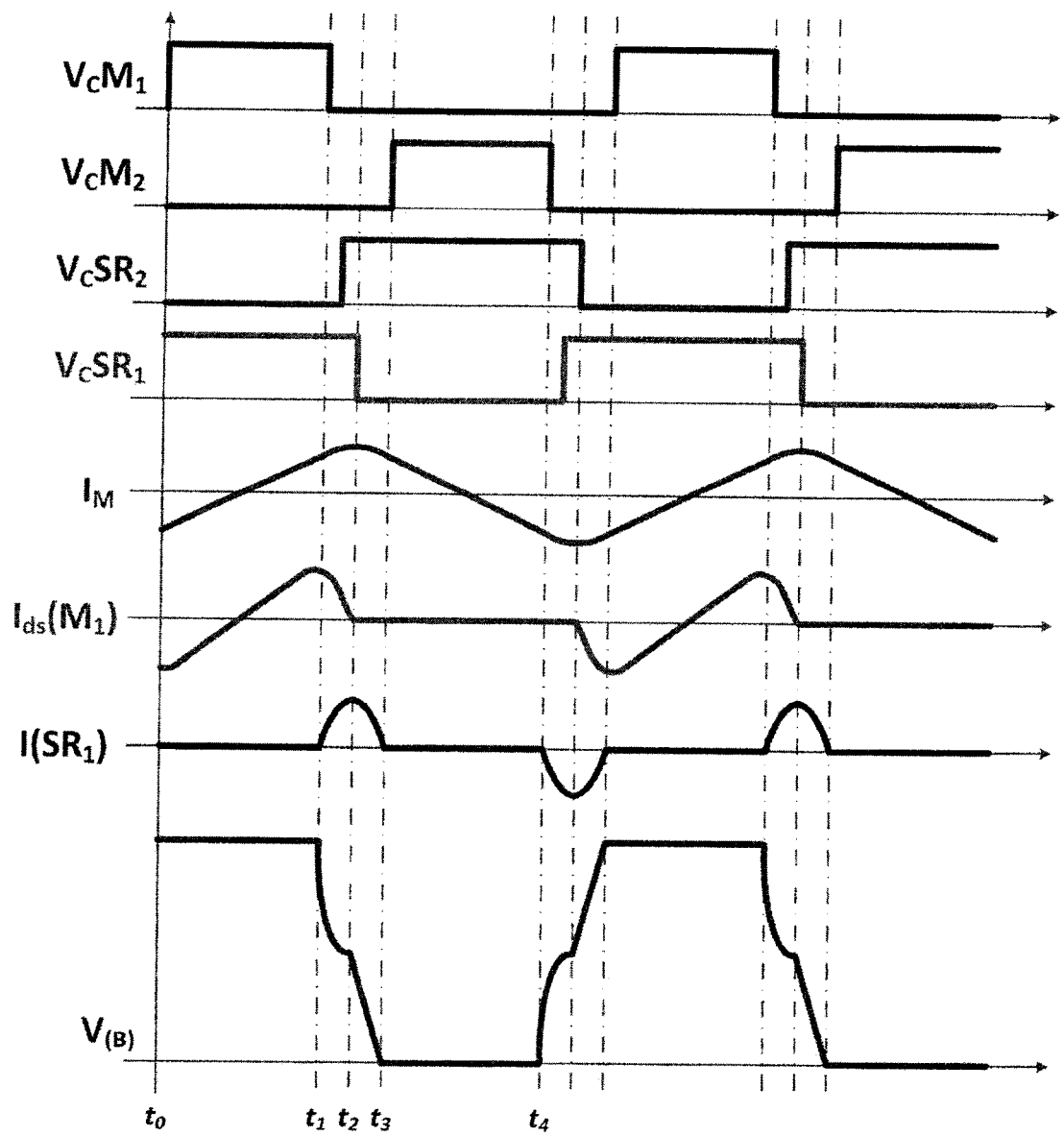
FIG. 9 depicts the key waveforms of the topology depicted in FIG. 7 wherein the output current is zero, "unloaded mode" and the operation is in critical mode without dead time.

The mode of operation for the "unloaded soft switching half bridge operating in critical mode" is described in FIG. 9. The key waveforms related to FIG. 7 are: VcM1, the control voltage for M1, VcM2, the control voltage for M2, VcSR2, the control voltage for SR2, VcSR1, the control voltage for SR1, IM, the magnetizing current through the transformer Tr, Ids (M1), the current through M1, I(SR1) the current through SR1, V(B) the voltage in the switching node B.

At t0 the primary switch M1 is turned on. The current through M1 which is the superposition of the output current Io reflected in the primary and the magnetizing current will be representing just the magnetizing current because Io it is zero. The magnetizing current IM, will ramp up from a negative level to a positive level of the same amplitude.

At t1, the primary switch M1 turns off. The current flowing through the leakage inductance of the transformer Tr, will start discharging the parasitic capacitances of the primary switchers and the parasitic capacitance of the transformer in a resonant manner. That resonant transition will occur between t1 and t2. The energy contained in the leakage inductance may not be enough to discharge the parasitic capacitances of the primary switchers. At t2 the synchronous rectifier SR1 will turn off and the short circuit in the secondary winding caused by the simultaneous conduction of SR1 and SR2 is opened up and the magnetizing current will flow into the primary and start to further discharge the parasitic capacitance across the primary switchers and of the transformer towards zero. This discharge is more linear and monotonic than the discharge which did occur between t1 to t2 by the energy contained in the leakage inductance. The magnetizing current will also charge the parasitic capacitances across SR1 in a monotonic way. The transition between t2 to t3 is done by a current source unlike the transition between t1 and t2. The transition produced by the current source is monotonic and does not have ringing and spikes. This mode of operation differs from the soft transition from the prior art which is done fully by the energy contained in the leakage inductance. In the prior art the leakage inductance was purposely increased in order to achieve zero voltage switching over the entire input voltage range and load range. In some cases additional inductive elements were added in series with the primary of the transformer and in some cases saturable inductances were placed in series with the secondary winding. In the prior art the voltage across the primary switchers did not decrease towards zero in a monotonic way and the voltage across the synchronous rectifiers did not rise in a monotonic way without ringing and spikes. In prior art we did experience spikes and ringing across the synchronized rectifiers at turn off even if zero voltage switching was accomplished across the primary switchers. This type of transition which is produced by a current source in this case the magnetizing current it is the most desirable because it is monotonic and does not produce ringing and spikes. This is one of the key embodiments of this invention.

At t3, the primary switch M2 will turn on at zero voltage switching conditions. Between t3 to t4 the magnetizing current IM, will start ramping down from a positive level to a negative level of the same amplitude.

At T4 the primary switch M2 turns off and the cycle start to repeat.

In this mode of operation there is not a dead time in addition to the transition time and the voltage in the switching node B will swing between a high level, Vin to zero. The energy contained in the leakage inductance when the primary switchers turn off is not dissipated but recycled. This mode of operation it is very efficient. Unlike other prior art soft switching technologies the soft transition it is not finalized by the energy contained in the leakage inductance. In this technology the soft transition is originated by the energy contained in the leakage inductance and finalized by the magnetizing current. In the prior art technologies the leakage inductance had to have a larger value to accomplish that and the soft transition was easily accomplished at higher output current where the current through the primary switchers was high at turn off. In this technology the energy contained in the leakage inductance can be very low and the soft transition is still accomplished. In this technology the leakage inductance in the transformer can be even zero and the soft switching is obtained. Being able to have soft switching with very small energy in the leakage inductance will allow us to optimize the transformer and increase the efficiency. In this invention the soft transition is finalized by the magnetizing current with lower dV/dt and the voltage across the synchronous rectifiers is monotonic without spikes and voltage ringing. This is one of the key embodiments of this invention.

Soft switching can be accomplished in this technology even with transformer with very small leakage inductance which is a big difference from the prior art soft switching technologies.

Synchronized and Partially Unloaded Forward Derived Soft Switching Half Bridge Operation Mode The current source Io which extracts the current from the switching node A can be synchronized with the primary switchers and the synchronous rectifiers in the secondary and shaped in a way that the current demanded by Io as per FIG. 7 to be zero after the primary switchers turn off but prior the synchronous rectifiers turn off. We have previously analyzed the behavior of the circuit depicted in FIG. 7 under the assumption that the current Io is zero. We will present the behavior of the circuit depicted in FIG. 7 when the current source Io is not zero but reaches zero level prior the synchronous rectifiers SR1 and SR2 are turned off.

There are two types of synchronized and partially unloaded soft switching half bridge operation modes.

One type is forward derived and another one is boost derived.

Figure 10:
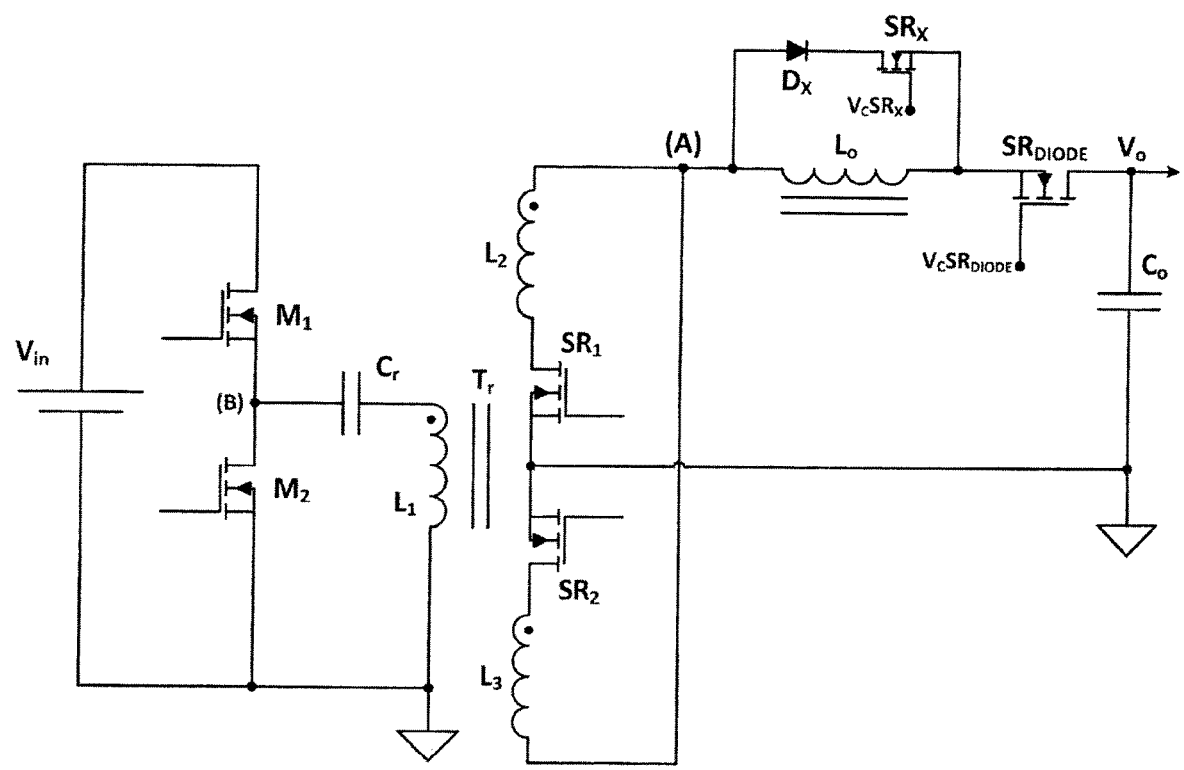
FIG. 10 depicts the synchronized and partially unloaded forward derived soft switching half bridge.

The forward derived synchronized and partially unloaded soft switching half bridge is depicted in FIG. 10. The key waveforms are described in FIG. 11.

Figure 11:
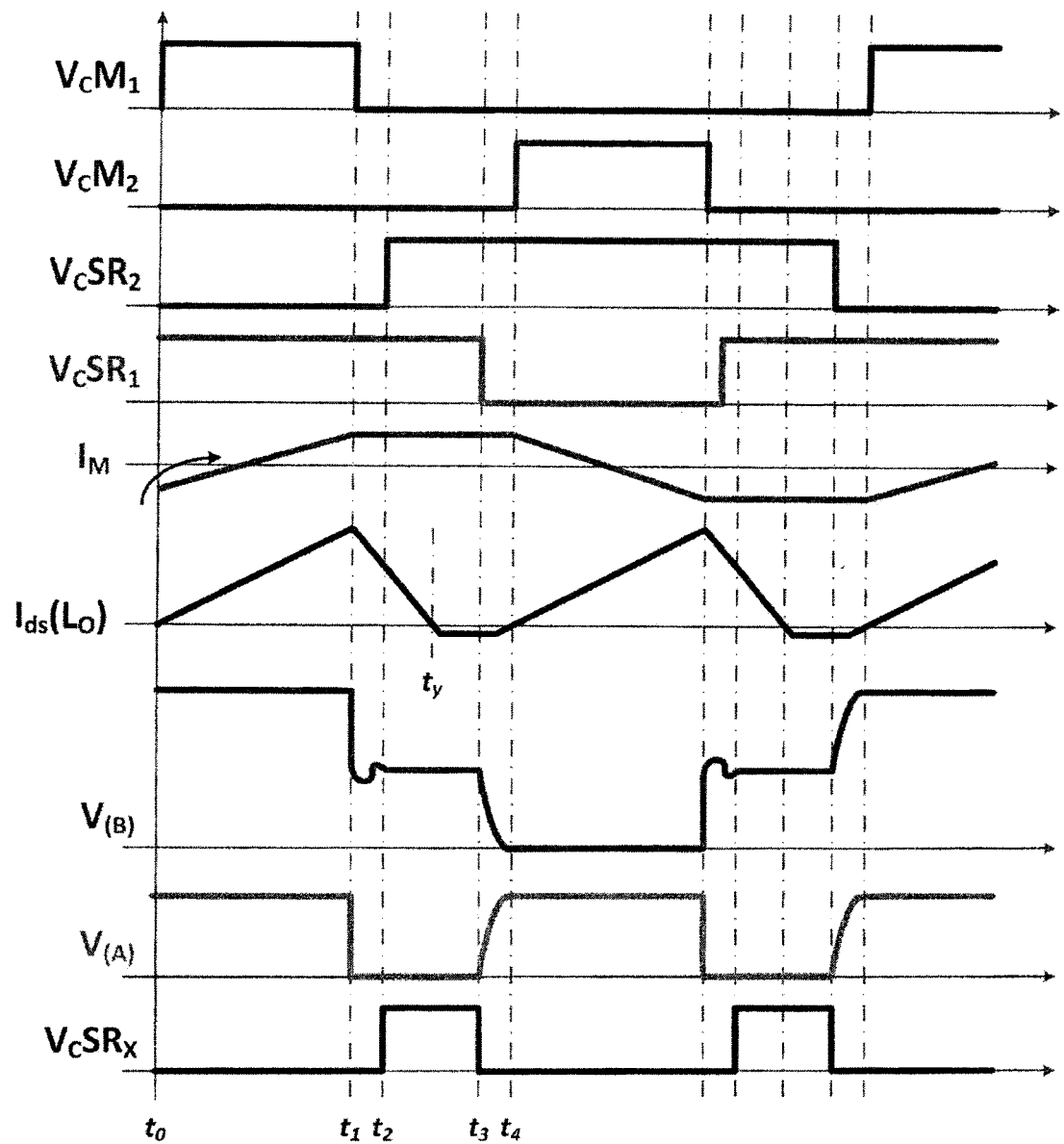
FIG. 11 depicts the key waveforms of the synchronized and partially unloaded forward derived soft switching half bridge.

In FIG. 11 are depicted, VcM1, the control signal for the M1 switch, VcM2, the control signal for M2 switch, VcSR2, the control signal for SR2, VcSR1, the control signal for SR1, IM, the magnetizing current through the transformer Tr, I(Lo), the current through Lo, V(B), the voltage in the switching node B, V(A) the voltage in the switching node A, and VcSRx, the control signal for SRx.

At t0, M1 is turned on and the magnetizing current IM, ramps up from a negative level to a positive level. In the same time the current through Lo will ramp up from zero to a peak level at t1. In this implementation the voltage in the secondary winding during the conduction of primary switchers M1 and M2 has to be higher than the output voltage. During the time interval t0 to t1 the energy is transferred from primary to secondary and in the same time energy is stored in the inductive element Lo.

At t1 the primary switch M1 is turned off. Shortly after t1, the SRdiode is turned on. The current through the inductor element Lo will continue to flow initially through the body diode of SRdiode until SRdiode is turned on offering a very low impedance path. The current through Lo will be ramped down with a slope proportional with the output voltage and the inductance of Lo.

At t2 the synchronous rectifier SR2 will be turned on and both SR1 and SR2 will conduct creating a short circuit across the secondary windings. The magnetizing current will flow through the low impedance path offered by SR1 and SR2 and secondary winding maintaining its amplitude. After t2 and prior ty, the synchronous rectifier SRx is turned on. The synchronous rectifier SRx is in series with a diode to underline its unidirectional conduction. The unidirectional switch can be implemented in other ways but that does not deviate from the scope of this invention.

At ty the current flowing through the inductor element Lo will reach zero. At that time all the energy stored in Lo is transferred to the output. SRdiode will turn off at zero current though in some applications it may allow a small amplitude current referred in this invention as "push back current" to flow from the output towards the switching node A. That current will further add to the magnetizing current in the discharge the parasitic capacitance of the primary switchers and of the transformer after SR1 will turn off at t3. After SRdiode turns off the resonant circuit formed by the parasitic capacitances of SRdiode and the inductor Lo will resonate creating voltage ringing in the source of SRdiode. The "push back current" will increase also the energy contained in that resonant circuit. The role of unidirectional switch formed by Dx and SRx is to shunt the current flowing from the output towards switch node A and release that current when SR1 will turn off. The unidirectional switch formed by Dx and SRx will eliminate the voltage ringing in the source of SR diode and harvest that energy to facilitate zero voltage switching in primary.

At t3, SRx and SR1 is turned off and the magnetizing current and the current trapped by SRx will be transferred to the primary to discharge the parasitic capacitance of primary switchers creating zero voltage switching conditions for M2. In the same time the magnetizing current and the "push back current" will monotonically charge the output capacitance of SR1.

At t4 the primary switch M2 will turn on at zero voltage switching conditions and the cycle repeats.

The "synchronized and partially unloaded forward derived soft switching half bridge operation mode does have the advantage over the "Critical conduction soft switching half bridge mode of operation" because it does allow the control of the dead time between the conduction time of the primary switchers regardless of the load and in this way creating an efficient operation at light load by lowering the repetition frequency. This is done with the penalty of using an additional synchronous rectifier SRdiode. The SRdiode can be replaced with a simple diode in application where the cost or the simplicity is a high priority.

Because in this mode of operation the energy is transferred in a forward mode the voltage in the secondary windings of the transformer have to be higher than the output voltage over the entire input voltage range. This will require higher voltage synchronous rectifiers.

Synchronized and partially unloaded boost derived soft switching half bridge operation mode Another derivation of the soft switching half bridge topology is the boost derived named in this patent application as: "partially unloaded boost derived soft switching half bridge". Partially unloaded has the meaning that the current source Io depicted in FIG. 7 reaches zero after the primary switchers turn off but prior the synchronous rectifiers turn off. The boost derived half bridge requires an additional synchronized rectifier, SR3, which connects to the common point between SR diode and the inductive element Lo.

Figure 12:
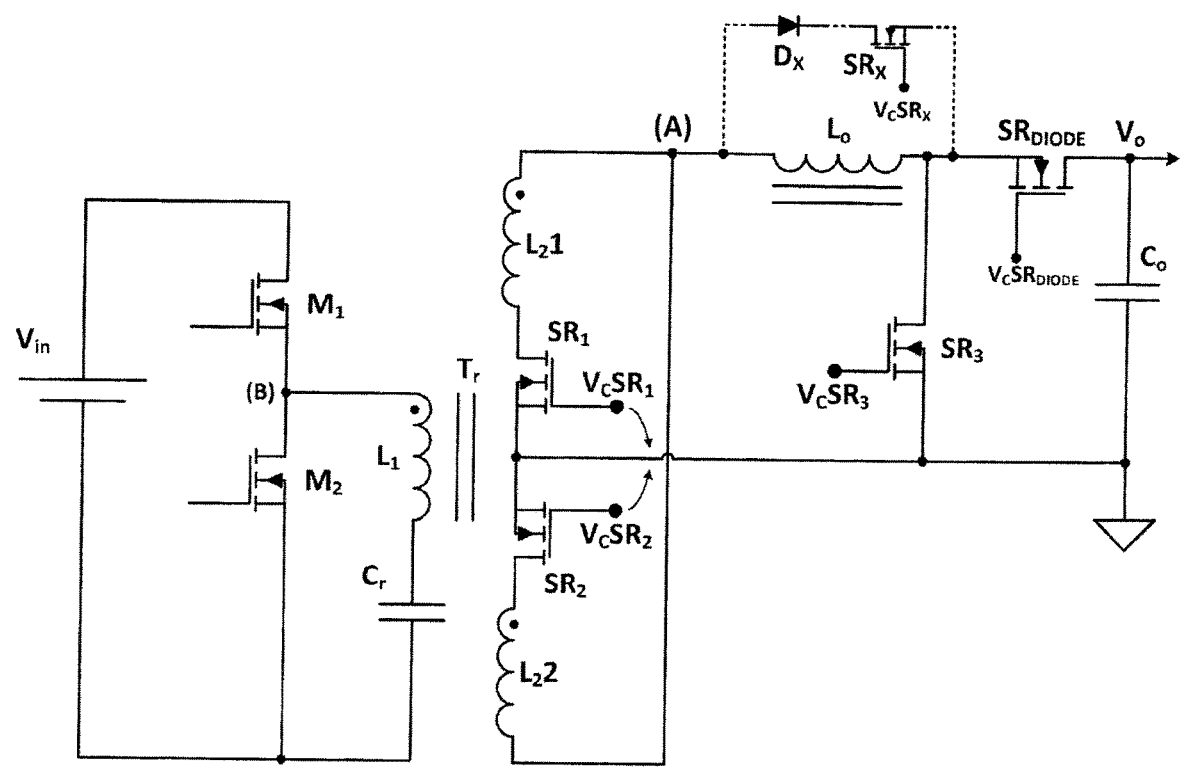
FIG. 12 depicts the synchronized; boost derived soft switching half bridge.
Figure 13:
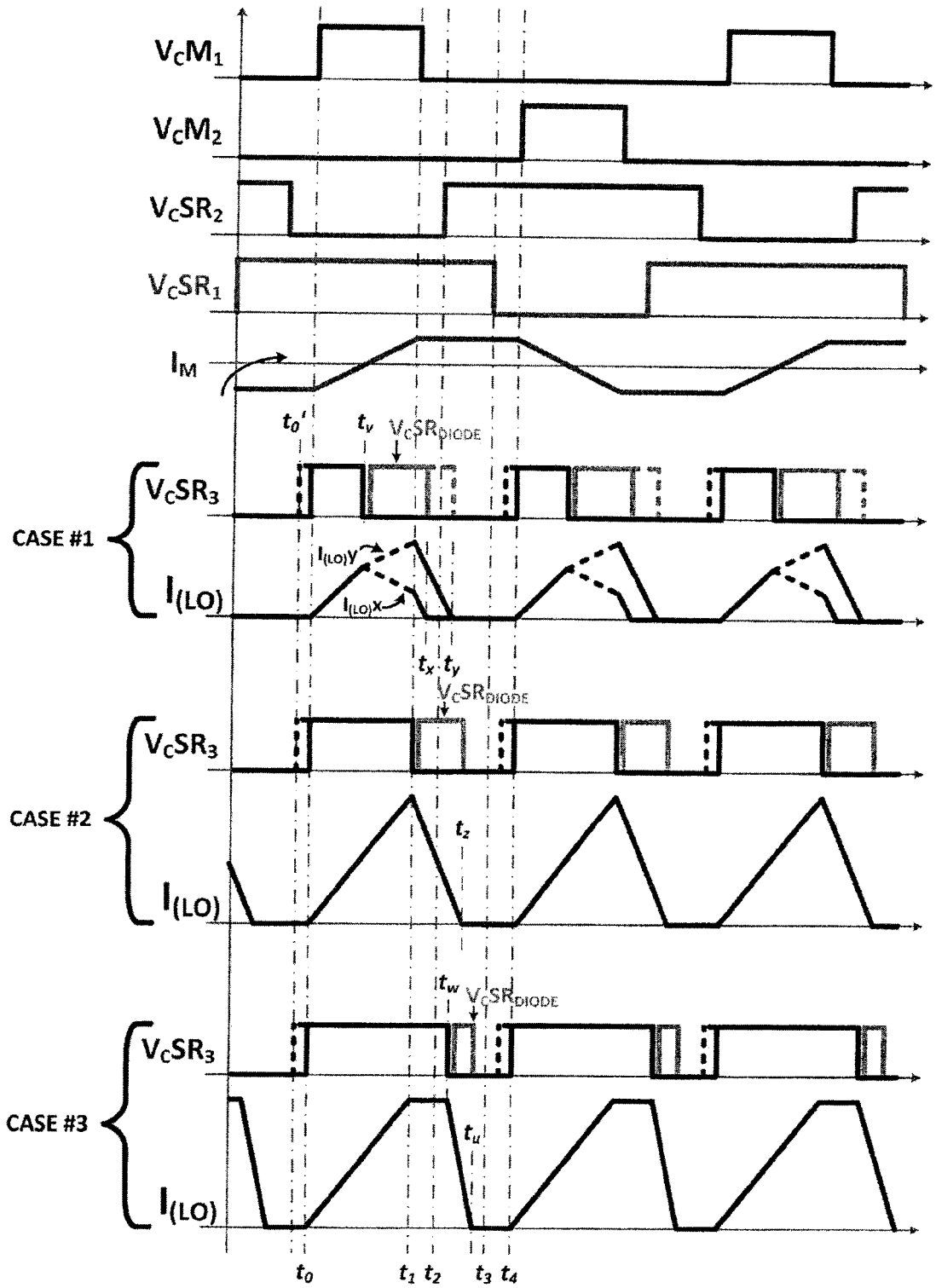
FIG. 13 depicts the key waveforms of the synchronized boost derived soft switching half bridge operating in partially unloaded mode.

This configuration is depicted in FIG. 12 and the key waveforms are depicted in FIG. 13. In FIG. 13 are presented the key waveforms of the circuit depicted in FIG. 12, such as, VcM1, the control signal for the primary switch M1, VcM2, the control signal for the primary switch M2, VcSR2, the control signal for the SR2, VcSR1, the control signal for SR1, IM, the magnetizing current of the transformer Tr, and in three different cases, VcSR3, the control signal for SR3, VcSRdiode, the control signal for SRdiode and I(Lo) the current through the inductive element Lo.

For the case #1, as depicted in FIG. 13 we have the following mode of operation.

At t0 the M1 will turn on and at the same time or slightly before, during the dead time wherein both Sr1 and SR2 are conducting, such as t0', SR3 is also turned on. If SR3 is turned on at t0', between t0' and t0 the voltage in the secondary winding is zero and SR3 will turn under zero voltage conditions. During the time interval t0 to tv when M1 and SR3 are on the current through Lo will build up from zero to a peak level at tv. During this time interval the voltage in the secondary winding L21 is applied across Lo. The energy transferred from the primary between t0 to tv is stored in Lo.

At time tv, the synchronized rectifier SR3 is turned off. In the primary switch M1 is still conducting. The current will continue conducting through the body diode initially of SRdiode for a very short period of time until SRdiode is turned on. Function of the difference between the voltage in the secondary winding and the output voltage the current will have a negative slope when the output voltage it is higher than the voltage induced in the secondary, such is depicted by I(Lo)x. When the voltage induced in the secondary winding L21 it is higher than the output voltage, the current in Lo has a positive slope as is depicted by I (Lo)y.

At t1 the primary switch turns off and soon after SR2 is turned on and the secondary windings are shorted by the simultaneous conduction of SR1 and SR2. The voltage in the switching node A is zero and the energy still left in Lo will be transferred to the output load.

At tx (ty) the current through Lo will reach zero which means that the entire energy stored in Lo was transferred to the load. At tx(ty) when the current through Lo reaches zero the synchronous rectifier SRdiode will be turned off. The current through SRdiode may be let to flow in reverse in some applications creating a "push back current". The "push back current" will add to the magnetizing current in order to discharge the parasitic capacitances of the primary switchers and of the transformer after SR1 turns off. After tx(ty) the voltage across the parasitic capacitance of SR3 and SRdiode is still charged to Vo voltage. That parasitic capacitance will be discharged and a current will start flowing through Lo towards switching node A until the voltage across SR3 will reach zero and the body diode will start conducting shorting the current though Lo through a very low impedance path created by SR1 and SR2 in conduction and the body diode off SR3 in conduction as well. As a result the magnitude of the current flowing through Lo will be preserved. In the event by design SRdiode will allow a push back current to flow from Vo towards A, that current will be also shorted by the SR1, SR2 and body diode of SR3 in conduction maintaining its amplitude.

At t3, SR1 will be turned off and the current flowing through Lo towards the switching node A will add up with the magnetizing current and flow into the primary to discharge the parasitic capacitances of the primary switchers and of the transformer creating zero voltage switching condition for M2 at time t4. In the same time the sum of the "push back current" and magnetizing current will also charge the parasitic capacitance across SR1 in a monotonic way towards the steady state level without ringing and spikes.

At t4 the primary switch M2 is turned on at zero voltage switching conditions and the cycle start to repeat.

The circuit formed by Dx and SRx which played a key role in the forward derived partially unloaded soft switching half bridge it is just optional in the boost configuration. The shorting of the current through Lo is done in this case by the synchronous rectifiers, SR1 and SR2 and the body diode of SR3. The SR3 can be also turned on between ty to t3 in order to decrease the impedance of the short circuit across Lo.

In case one we have two steps wherein the energy transfer from primary to secondary is done, from t0 to tv by storing energy in Lo very similar to a boost and flyback converter. The second step wherein the energy is further transferred from the input towards the load it is in between tv to t1, period wherein more energy will be stored in Lo in the event the voltage across the secondary winding it is larger than the output voltage. At the end of t1 when the primary switchers turn off the entire energy stored in Lo will be further transferred to the load. In this embodiment the current through Lo is shaped in a quasi-trapezoidal shape reducing the amplitude of the peak current and lowering the ratio Irms/Ioavg which can lead to higher power conversion efficiency. The power transfer from the primary to the load it is modulated by the conduction time of SR3. At very light load the dead time between the primary switchers can be increased further decreasing in this way the repetition frequency. To further increase the efficiency of the convertor at light load, the on time of the primary switchers can be reduced as well, as long that the on time of the primary switchers is larger than the on time of SR3.

For the case #2, as depicted in FIG. 13 we have the following mode of operation.

At t0 the M1 will turns on and at the same time or slightly before, during the dead time, wherein both Sr1 and SR2 are conducting, t0', SR3 is turns on as well. If SR3 is turned on at t0', between t0' and t0 the voltage in the secondary winding is zero and SR3 will turn under zero voltage conditions. During the time interval t0 to t1 when M1 and SR3 are turned on the current through Lo will build up from zero to a peak level at t1. During this time interval the voltage in the secondary winding L21 is applied across the Lo. The energy transferred from the primary towards the secondary will be stored in Lo.

At time t1, the primary switch M1 and the synchronized rectifier SR3 is turned off. The current will start conducting initially through the body diode of SRdiode for a very short period of time until SRdiode is turned on. Shortly after t1, the SR2 is turned on while SR1 is still conducting creating a low impedance path across the secondary winding for the magnetizing current which will maintain its amplitude. The voltage in the switching node A is zero and the other end of Lo is connected to the output voltage Vo.

At tz the current through Lo will reach zero which means that the entire energy stored in Lo was transferred to the load. At tz when the current through Lo reaches zero the synchronous rectifier SRdiode will be turned off. The current through SRdiode may be let to flow in reverse and turn off the SRdiode when the negative current reaches certain amplitude. This current flowing in reverse referred in this application as a "push back current" will add to the magnetizing current in order to discharge the parasitic capacitances of the primary switchers and of the transformer to obtain zero voltage switching conditions for M2 after SR1 turns off. After SRdiode is turned off the voltage across the parasitic capacitance of SR3 and SRdiode is still charged to Vo voltage. That parasitic capacitance will be discharged and a current will start flowing through Lo towards switching node A until the voltage across SR3 will reach zero and its body diode will start conducting shorting the current through Lo through a very low impedance path created by SR1 and SR2 in conduction and the body diode off SR3 in conduction as well. As a result the magnitude of the current flowing through Lo will be preserved. In the event SRdiode will allow a "push back current" to flow from Vo towards A, that current will be also shorted by the SR1, SR2 and body diode of SR3 in conduction maintaining its amplitude.

At t3, SR1 will be turned off and the current flowing through Lo towards the switching node A will add up with the magnetizing current and flow into the primary when SR1 turns off, to discharge the parasitic capacitance of the primary switchers and of the transformer creating zero voltage switching condition for M2 at time t4. In the same time the sum of the push back current and magnetizing current will also charge the parasitic capacitance across SR1 in a monotonic way towards the steady state level without ringing and spikes.

At t4 the primary switch M2 is turned on at zero voltage switching conditions and the cycle start to repeating.

In the case #2 the energy is transferred from the primary to the Lo between t0 to t1 and between t1 to tz that energy is transferred from Lo to the output load. This mode of operation it is very similar to the flyback topology. In the flyback topology the magnetizing current stores the energy during the conduction of the primary switch and after that the magnetizing current reflected in the secondary will transfer the energy stored to the output. The difference is that the energy is transferred in a forward mode through the transformer in a very efficient way and the role of the magnetizing inductance is played by Lo. Separating the forward transformer from the energy stored in the magnetizing inductance does increase the efficiency of the transformer and makes this topology much more efficient. In lower power application, less than 65 W, the flyback transformer has an efficiency around 96% while the transformer efficiency in a forward derived transformer such as the one used in the half bridge can be higher than 99%. The output inductor Lo can be implemented to have very high efficiency as a result the overall efficiency of the transformer and inductor will be much higher than the efficiency of the transformer in the flyback topology.

For the case #3, as depicted in FIG. 13 we have the following mode of operation.

At t0 the M1 will turn on and at the same time or slightly before, during the dead time, wherein both Sr1 and SR2 are conducting, t0', SR3 is turned on as well. If SR3 is turned on at t0', between t0' and t1 the voltage in the secondary winding is zero and SR3 will turn under zero voltage conditions. During the time interval t0 to t1 when M1 and SR3 are turned on the current through Lo will build up from zero to a peak level at t1. During this time interval the voltage in the secondary winding L21 is applied across the Lo. The energy transferred from the primary towards the secondary will be stored in Lo.

At time t1, the primary switch M1 is turned off. The SR3 it is still on until tw. As a result both ends of the inductor Lo are connected to ground. From t1 to tw the current through Lo will maintain its amplitude. At tw SR3 is turned off and the current will continue to flow through Lo and through the body diode of SRdiode. At one end of the inductor element Lo, is connected to the switching node A which between t1 to t3 has zero voltage and at the other end it is connected to Vo. As a result the current through Lo will ramp down with a slope proportional with the inductance of Lo and the output voltage Vo. At tu the current through Lo reaches zero level which means that the entire energy stored in Lo was transferred to the load. At tu when the current through Lo reaches zero the synchronous rectifier SRdiode will be turned off. The current through SRdiode may be let to flow in reverse and turn off the SRdiode when the negative current reaches a certain amplitude. This current flowing in reverse referred as a "push back current" will be added to the magnetizing current in order to discharge the parasitic capacitances of the primary switchers and of the transformer to obtain zero voltage switching conditions for M2. After SRdiode is turned off the voltage across the parasitic capacitance of SR3 and SRdiode is still charge to Vo voltage. That parasitic capacitance will be discharged and a current will start flowing through Lo towards switching node A until the voltage across SR3 will reach zero and the body diode will start conducting shorting the current through Lo through a very low impedance path created by SR1 and SR2 in conduction and the body diode of SR3. As a result the magnitude of the current flowing through Lo will be preserved. In the event SRdiode will allow a "push back current" to flow from Vo towards A, that current will be also shorted by the SR1, SR2 and body diode of SR3 in conduction maintaining its amplitude.

At t3, SR1 will be turned off and the current flowing through Lo towards the switching node A will add up with the magnetizing current and flow into the primary to discharge the parasitic capacitance of the primary switchers and of the transformer creating zero voltage switching condition for M2 at time t4. In the same time the sum of the push back current and magnetizing current will also charge the parasitic capacitance across SR1 in a monotonic way towards the steady state level without ringing and spikes.

At t4 the primary switch M2 is turned on at zero voltage switching conditions and the cycle start to repeat.

In the case #3 the energy is transferred from the primary to the Lo between t0 to t1 and between tw t0 to that energy is transferred to the output load. In between t1 to tw the current amplitude it is just maintained by the short circuit formed by the simultaneous conduction between SR1, SR2 and SR3.

Figure 14:
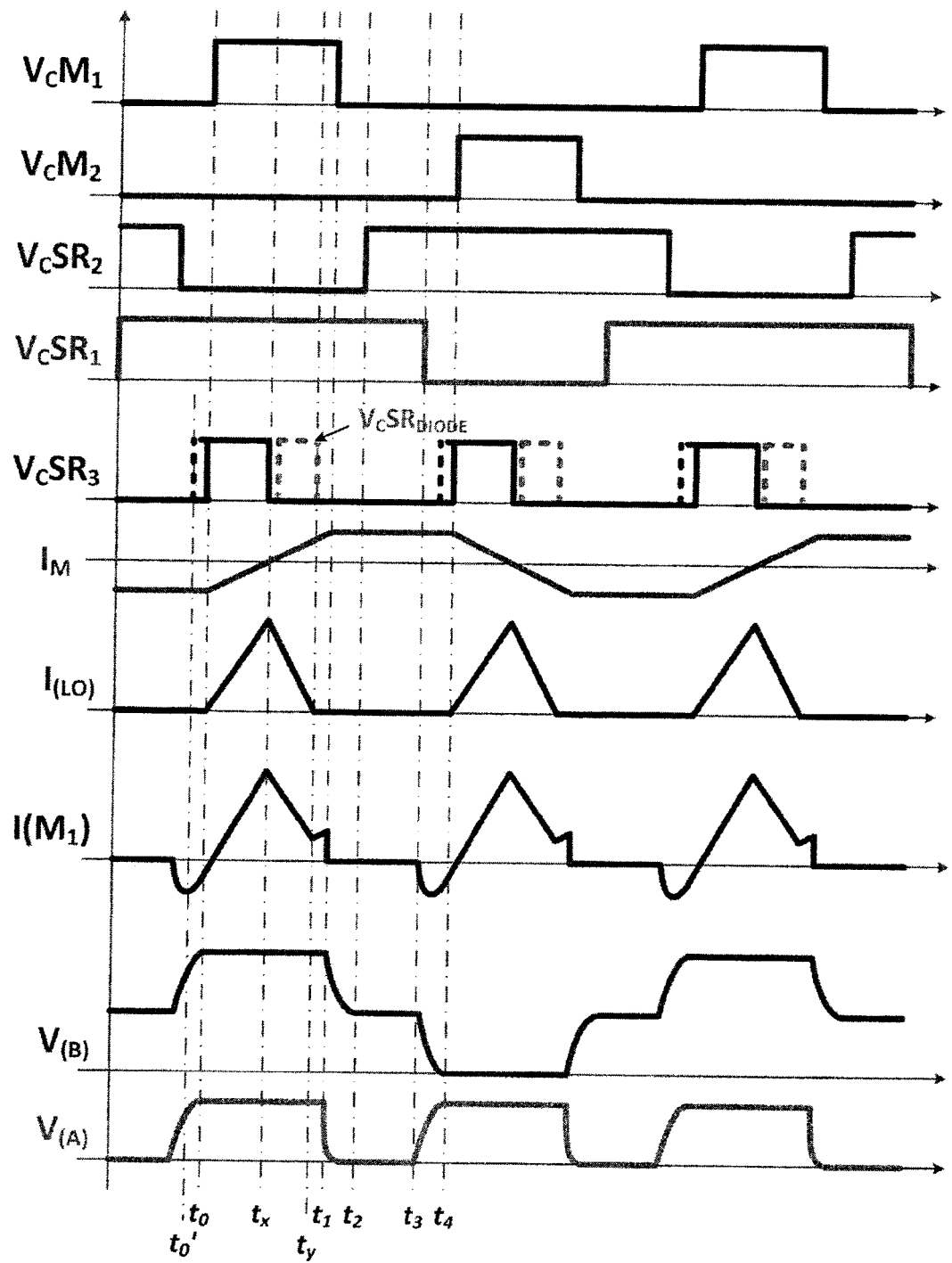
FIG. 14 depicts the key waveforms of the synchronized boost derived soft switching half bridge operating in timely loaded mode.

Synchronized and Timely Loaded Boost Derived Soft Switching Half Bridge Operation Mode Timely loaded mode of operation means that the energy transfer to the output is done only during the on time of the primary switchers. After the primary switchers are off there is no further energy transferred from primary to the output and the energy stored in Lo is zero. In FIG. 14 are depicted the key waveforms in the synchronized and timely loaded boost derived soft switching half bridge operation mode.

In FIG. 14 are presented the key waveforms of the circuit depicted in FIG. 12, such as, VcM1, the control signal for the primary switch M1, VcM2, the control signal for the primary switch M2, VcSR2, the control signal for the SR2, VcSR1, the control signal for SR1, VcSR3 and VcSRdiode, which are the control signals for SR3 and SRdiode, IM, the magnetizing current of the transformer Tr, I(Lo), the current through Lo, I(M1), the current through M1, V(B) the voltage in the switching node B and V(A) the voltage in the switching node A.

At t0 the primary switch M1 is turned on. The magnetizing current will start to build up from a negative level at to, to a positive level at t1, of the same amplitude as at t0. SR3 is turned on at t0 or slightly earlier, t0', when the voltage in the secondary of the transformer is zero. The current through Lo will start ramping up from zero to a peak level at tx. The current through M1 is composed by the summation of the current through Lo, I(Lo), reflected in the primary and the magnetizing current, IM reflected in the primary. As a result the current through M1 will start from a negative level and build up to the peak level at tx.

At tx synchronous rectifier SR3 turns off. The current through Lo will continue to flow initially through the body diode of SRdiode and then through SRdiode which is turned on immediately after SR3 is turned off. After tx the voltage across Lo is the difference between the output voltage and the input voltage reflected into the secondary winding. By design the turn ratio of the transformer is chosen to have Vo larger than the voltage in the secondary winding. If this condition is met the current through Lo will start ramping down towards zero after tx. The current will reach zero level at ty. At that time SRdiode is turned off. Between ty to t1 the parasitic capacitance across SR3 and SR4 may oscillate with the inductive element Lo. In such a case function of the application a circuit formed by a diode Dx in series with a controlled mosfet SRx such as the one depicted in FIG. 10 and with dotted line in FIG. 12 can be added across Lo. The SRx will be turned on sometimes between tx and ty and turned off at t1. That will preserve the energy stored in the parasitic capacitances across SR3 and SR4 through a current flowing through Lo towards switching node A. This current will add to the magnetizing current and discharge the parasitic capacitances across M1 and M2 and the transformer after SR1 will turn off at time t3.

At t1 the primary switch M1 will turn off. At that time the current flowing through M1 is reduced just to the amplitude of the magnetizing current which by design can be quite low for higher efficiency. As a result the ringing in the switching node B at the turn off of M1 it can be very small unlike the previous mode of operation. This is another advantage of this embodiment which makes this mode of operation very desirable and one of key embodiments of this invention.

At t2, SR2 is turned on and between t2 and t3 both synchronized rectifiers, SR1 and SR2 are in conduction. During this time a short circuit is created across the secondary winding preserving the amplitude of the magnetizing current.

At t3 the SR1 is turned off and the current flowing into SR1 was just the magnetizing current and the current "trapped" by Dx and SRx which is derived from the energy stored in the parasitic capacitance across SR3 and SRdiode. The magnetizing current and the current "trapped" by Dx and SRx, in the event wherein that circuit is utilised, will be transferred to the primary discharging the parasitic capacitance of M1 and M2 creating zero voltage switching conditions for M2 at t4 when M2 is turned on.

In applications which have only one output, the Dx and SRx circuit is not necessary because the t1 can be always tailored to occur shortly after ty ideally in the optimum point of the resonance between Lo and the parasitic capacitance across SRdiode and SR3. In the same time having the on time of the primary switchers tailored to be close to the time interval between t0 to ty, when the energy transfer from primary to the output is done, it will maximize the efficiency over all the loading conditions. That is because the on time of the primary switchers is proportional with the flux swing in the transformer and as a result with the core loss. In this way if the energy transfer to the output decreases the core loss will decrease as well.

In this mode of operation the energy transfer from the primary to Lo is done between t0 to tx and after that the energy is further transferred to the output from the primary between tx to ty and in the same time whatever energy was stored in Lo is totally transferred to the secondary.

After the primary switch is turned off there is no more energy in the inductive element Lo and there is no further energy transfer to the secondary. As a result the dead time period can be reduced to the transition time and that mode of operation is named "Synchronized and timely loaded boost derived soft switching half bridge operating in critical mode".

The "Synchronized and timely loaded boost derived soft switching half bridge operation mode" it will be always used at the lighter loads when the frequency of operation has to be decreased for the optimum efficiency.

Synchronized and Timely Loaded Boost Derived Soft Switching Half Bridge Operating in Critical Mode Because there is no energy transferred from the inductor element Lo to the output except during the conduction time of the primary switchers this mode of operation does not need dead time and the half bridge can operate in critical mode as described in FIG. 9. In this mode of operation there is no dead time and between the conduction times of the primary switchers we have just the transition time wherein the voltage in the switching node B swings between zero and the input voltage. By eliminating the dead time the leakage inductance energy in the transformer it is used for the soft transition and it is not dissipated as it is the case in the previous modes of operation. The leakage inductance it is fully recycled and there is no ringing in switching node B. This mode of operation it is the most efficient and it is one of the key embodiments of this invention. Under certain condition such as the start up for example when the output voltage is low the half bridge will operate with dead time but once the current through Lo will reach zero before the primary switchers turn off the converter will go back to the critical conduction mode of operation.

At t0 the M1 will turn on and at the same time SR3 is turned on. The SR3 can be turn on slightly before when the voltage in the secondary winding is zero. The current through Lo will build up from zero to a peak level at tx. During this time interval the voltage in the secondary winding L21 is applied across the Lo, and the energy transferred from the primary towards the secondary will be stored in Lo.

The current through M1 is composed by the summation of the current through Lo, I(Lo), reflected in the primary by the turn ratio of the transformer plus the magnetizing current reflected in the primary. As a result the current will start from a negative level and build up to the peak level at tx.

At tx synchronous rectifier SR3 turns off. The current through Lo will continue to flow initially through the body diode of SRdiode and then through SRdiode which will be turn on immediately after SR3 is turned off. The voltage across Lo is the difference between the output voltage and the input voltage reflected into the secondary winding. By design the turn ratio of the transformer is chosen to have Vo larger than the voltage in the secondary winding. If this condition is met the current through Lo will start ramping down towards zero after Tx. The current will reach zero level at ty. At that time SRdiode is turned off. Between ty to t1 the parasitic capacitance across SR3 and SRdiode may oscillate with the inductive element Lo. In such a case function of the application a circuit formed by a diode Dx in series with a controlled Mosfet SRx can be added across Lo such as the one depicted in FIG. 10 and FIG. 12 with dotted lines. The SRx will be turned on sometime between tx and ty and turn off at t1. That will preserve the energy stored in the parasitic capacitances across SR3 and SR4 through a current flowing through Lo towards switching node A. That current will add to the magnetizing current and used to discharge the parasitic captaincies across M1 and M2 and the transformer after SR1 will turn off at time t3.

In applications which have only one output, the Dx and SRx circuit is not necessary because the t1 can be always tailored to occur shortly after ty ideally in the optimum point of the resonance between Lo and the parasitic capacitance across SRdiode and SR3. In the same time having the on time of the primary switchers tailored to be close to the time interval between t0 to ty, when the energy transfer from primary to the output is done, it will maximize the efficiency over all the loading conditions. That is because the on time of the primary switchers is proportional with the flux swing in the transformer and as a result with the core loss. In this way if the energy transfer to the output decreases the core loss will decrease as well.

At t1 the primary switch M1 will turn off. At that time the current flowing through M1 is reduced just to the amplitude of the magnetizing current which by design can be quite low. The energy contained in the leakage inductance will start discharging the parasitic capacitances of M1 and M2 in primary in a resonant way. The energy contained in the leakage inductance in most of the applications will not be enough to swing the voltage in switching node B to zero.

At t3 the synchronized rectifier SR1 is turned off. At that time the magnetizing current and the additional current flowing through Lo towards the switching node will be transferred to the primary and start discharging the parasitic capacitance of the primary switchers towards zero.

At t4 M2 will turn on at zero voltage switching conditions. The magnetizing current also charges the parasitic capacitance of SR1 towards the steady state level in a monotonic way without spikes and ringing.

This mode of operation it is one of the preferred embodiment of this invention. The energy transfer from primary to the load is done entirely during the time wherein the primary switchers are on. The elimination of dead time allows the recycling of the energy contained in the leakage inductance and used for soft transition across the primary switching elements. In switching node B there is no ringing as in previous modes of operation. This mode of operation it is the preferred mode of operation between the full and medium load. At lighter load for maximum efficiency the synchronized and timely loaded boost derived soft switching half bridge operation mode it may be preferable.

Start Up and Short Circuit Operation Mode

Figure 16:
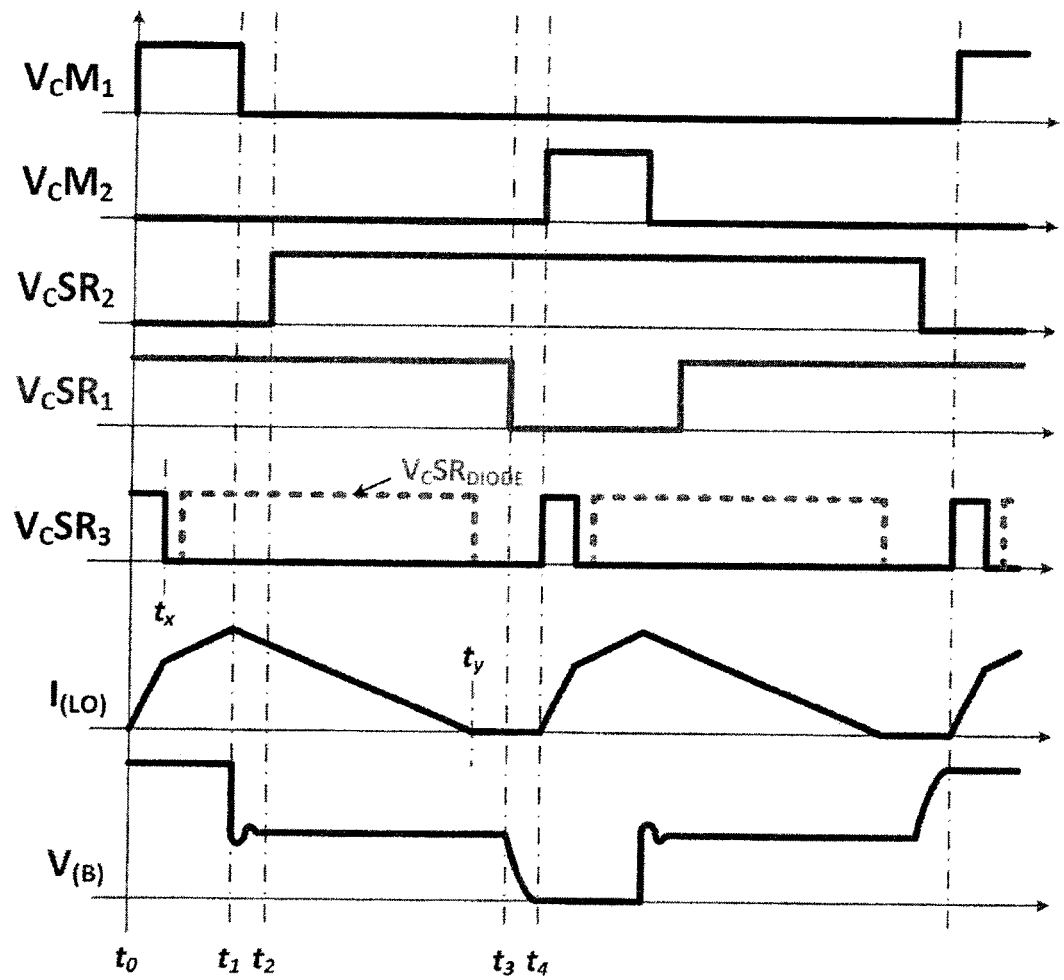
FIG. 16 depicts the key waveforms of the synchronized boost derived soft switching half bridge operating at start up or short circuit when the output voltage it is very low.

At the start up and in the short circuit conditions the output voltage is zero or very low. As a result this mode of operation cannot be maintained. In such cases the operation will require the presence of dead time as depicted in FIG. 16.

At t0 the primary switch M1 turns on. The on time which is the conduction time between t0 to t1 is smaller to limit the current. The goal at start up is to limit the power transfer towards the load and to increase slowly the power transfer and create a monotonic rise for the output voltage.

At tx, SR3 is turned off and the current will continue to flow through Lo. Because the output voltage is very low at start up the current will further increase with a slope proportional to the difference between the output voltage and the voltage across the secondary windings of the transformer.

At t1 the current has even greater amplitude than at tx. At t1 the primary switch M1 turns off and the voltage in the secondary winding becomes zero and both synchronous rectifiers SR1 and SR2 will conduct after t2. The voltage applied to Lo is just Vo and even if that value is low it is becoming larger than zero after one cycle. The first dead time which in FIG. 16 is the difference between t3 to t1 at startup has to be large to ensure that the current through Io reaches zero before the next cycle. However, if that condition is not met the current will be forced to zero at the time when M2 will turn on. The inductor element will limit the dI/dt at that time and it will not be destructive for the switching element but will lead to hard switching which is not as efficient as mode of operation.

At ty the current through Lo reaches zero and SRdiode is turned off. After that time there is no more energy transfer to the load. As presented previously by design SRdiode can conduct for a longer time and create a "push back current" which will add to the magnetizing current to obtain zero voltage switching in the primary. That may be necessary in the case the on time (t0 to t1) is too small and the magnetizing current is low and will not be able to discharge the parasitic capacitances of M1 and M2 in a given time period.

At t3 the synchronous rectifier SR1 is turned off and the magnetizing current in addition to the push back current will be transferred to the primary and discharge the parasitic capacitances of M1 and M2 towards zero.

At t4 M2 is turned on under zero voltage switching conditions.

Figure 15:
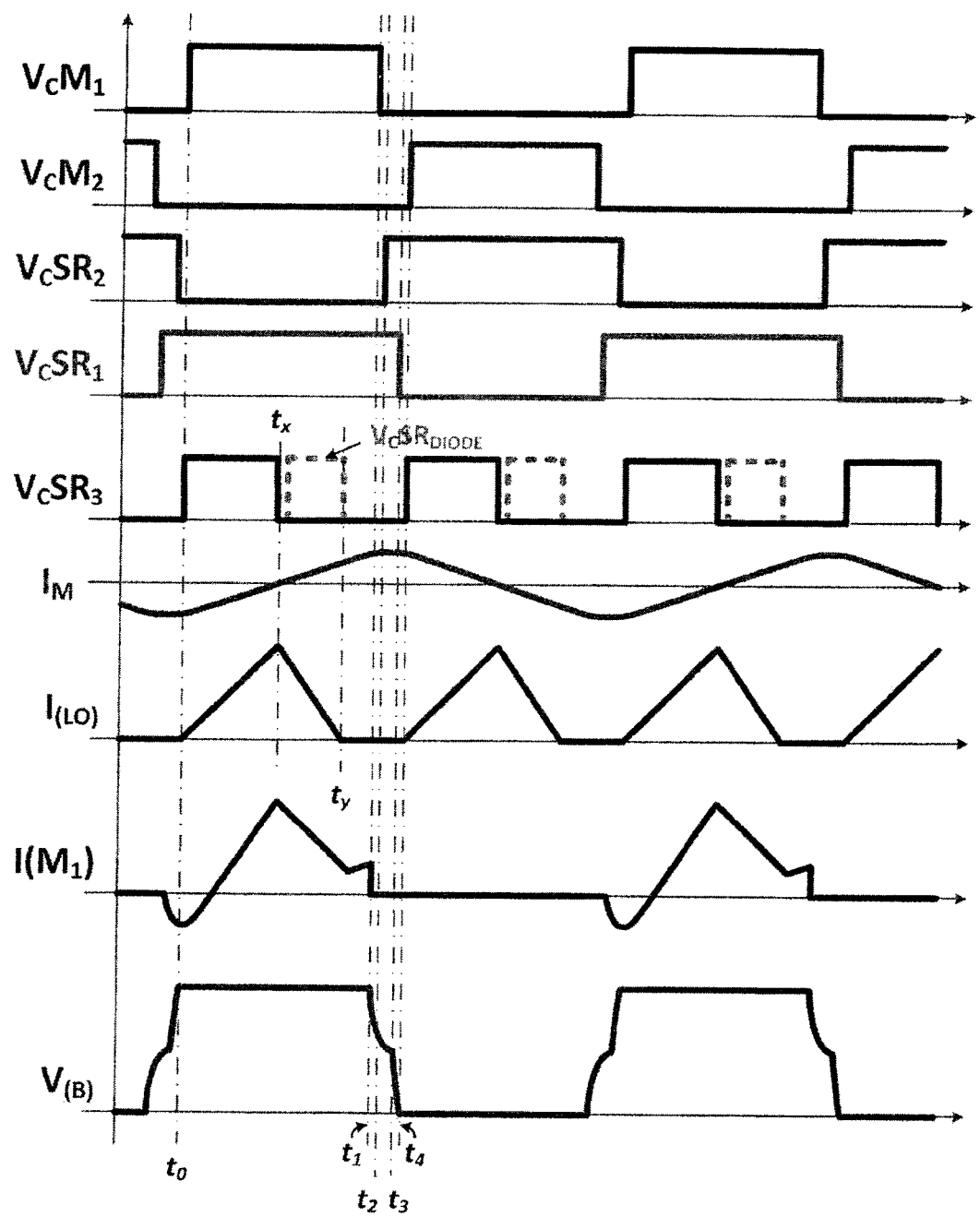
FIG. 15 depicts the key waveforms of the synchronized boost derived soft switching half bridge operating in timely loaded and critical mode

When the output voltage in secondary reaches the nominal level the mode of operation will switch to the one depicted in FIG. 15.

Multiple Outputs

Figure 17:
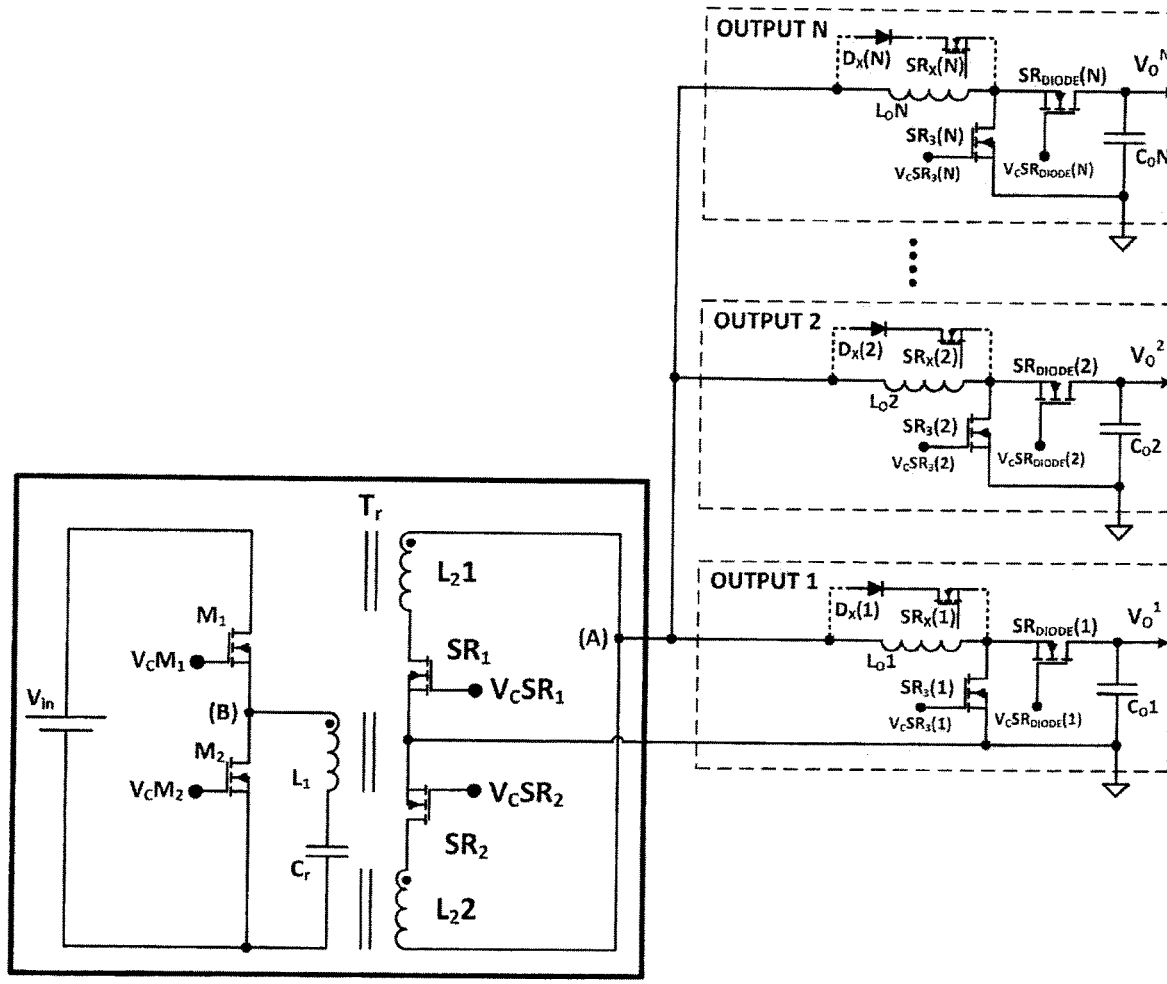
FIG. 17 depicts the synchronized boost derived soft switching half bridge configuration with multiple outputs.

One of the advantages of this invention is the fact that it is highly suitable with multiple outputs. In FIG. 17 is depicted the general concept of multiple outputs. The base half bridge converter is composed by two primary switchers M1 and M2, a capacitor Cr in the primary and in the secondary there are two synchronous rectifiers SR1 and SR2. The transformer has a primary winding L1 and two secondary winding L21 and L22. This configuration applies to the center tap configuration, though the secondary can be structured as current doubler or a full bridge rectification. Each output has an inductive element, Lo1 to LoN, a boost switch SR3(1) to SR3(N) and a diode switch, SRdiode(1) to SRdiode(N) and an optional clamp formed by a diode in series with a controller Mosfet, Dx1-Dxn, SRx1-SRxN. Each output voltage may have a different voltage and a different load. The preferred mode of operation is "synchronized timely loaded boost derived soft switching half bridge operating in critical mode".

The configuration depicted in FIG. 17 it is ideal for application wherein each output should be able to deliver a range of output voltages such is the case in the multiple outputs class C USB. For other application when the output voltages are very different from each other and thee outputs are dedicated to a specific output voltage it may be more efficient to have different secondary windings with their corresponding synchronized rectifiers coupled on the same transformer.

Figure 18:
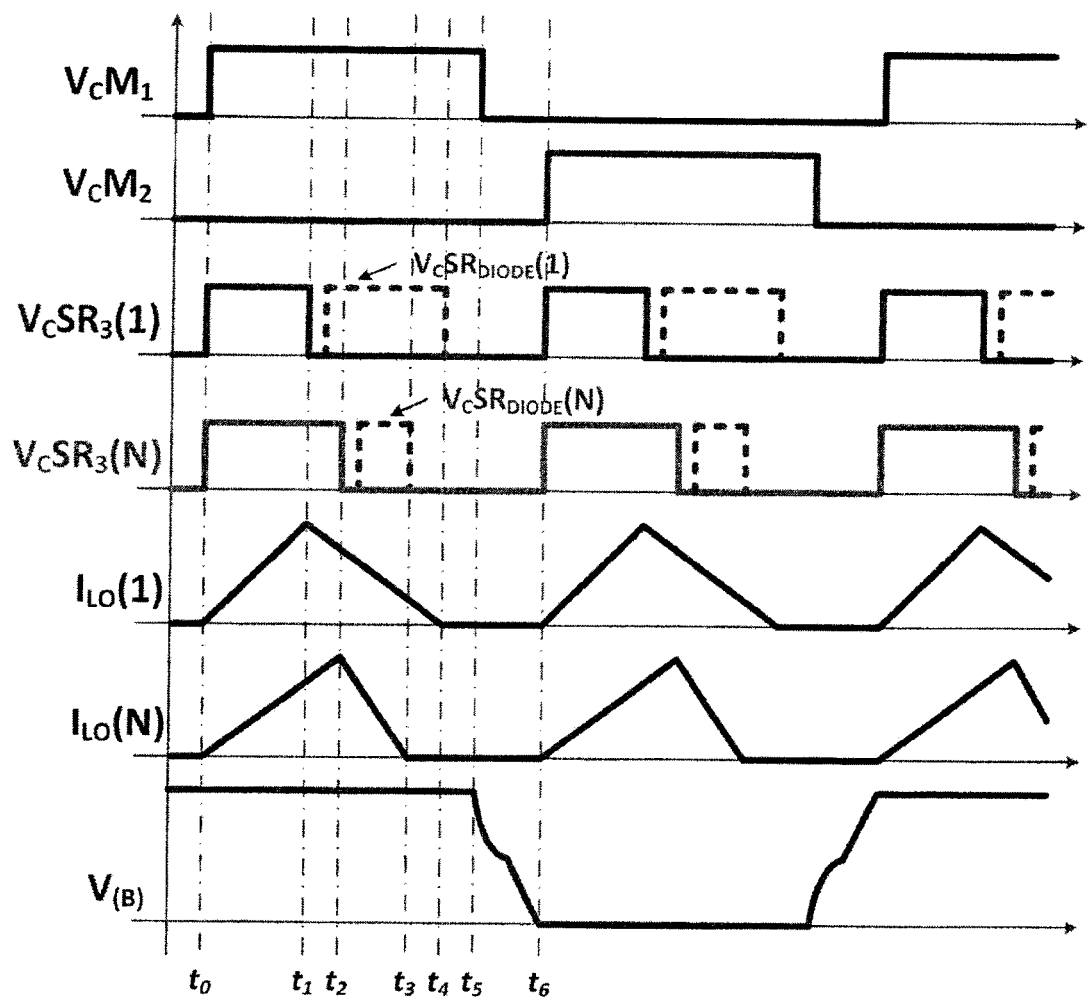
FIG. 18 depicts the key waveforms of the topology presented in FIG. 17 wherein the output #1 and output #N do operate in synchronized and timely loaded boost derived soft switching half bridge operating in critical mode.

In FIG. 18 are depicted the key waveforms of the mode of operation while applies to all the outputs. For simplicity is depicted two outputs, output 1 and output N For output 1 we have the following:

At t0 the primary switch M1 turns on. SR1 is on and a voltage will be induced in the secondary winding. On the output 1, the SR3(1) is turned on for a time interval t0 to t1. The current through Lo1 will start to build up with a given slope which is function of the voltage induced in the secondary winding and the inductive element Lo. In the event the multiple outputs require that each output shall deliver the same set of voltages, such as is the case of the power delivery system using class C USB, the inductive elements have to be equal. As a result the ramp up slope for each output voltage is equal.

At t1 the synchronous rectifier SR3(1) is turned off. By design the turn ratio of the transformer is done in a way that the output voltage is higher than the input voltage reflected in the secondary winding of the transformer Tr. As a result when the SR3(1) turns off the current will continue to flow initially through the body diode of SRdiode(1) until SRdiode (1) turns on which is shortly after SR3(1) turns off. The current through Lo1 will start ramping down and it will reach zero current level at t4. At that time also SRdiode(1) will turn off. In some applications SRdiode(1) may conduct a little longer if a "push back current" is needed. At t4 the energy transfer from primary to the load ends.

For output N we have the following:

At t0 the primary switch M1 turns on and a voltage will be induced in the secondary winding L21. At t0 also SR3 is turned on for a time interval t0 to t2. The current through LoN will start to build up with the same slope as the output 1, if Lo1 to LoN have the same inductance.

At t2 the synchronous rectifier SR3(N) is turned off. The SR3 (N) turns off and the current will continue to flow initially through the body diode of SRdiode (N) until SRdiode (N) turns on which is shortly after SR3(N) turns off. The current through LoN will start ramping down and it will reach zero current level at t3. In this example the down slope of output N is higher because the output voltage on the output N is higher. The current will reach zero level at time t3. At t3 the energy transfer from primary to the load ends.

For both outputs the current reaches zero prior t5 which is the time wherein the primary switch M1 turns off. By design the goal is that for all the outputs the mode of operation shall be "synchronized timely loaded boost derived soft switching half bridge operating in critical mode". By design this condition shall be met over the entire input voltage range and the entire loading condition range.

At t5 the primary switch turns off and the soft transition starts. Initially the discharge of the parasitic capacitances across M1 and M2 and the parasitic capacitance of the transformer is done by the energy contained in the leakage inductance. After SR1 turn off which is sometime between t5 to t6 the magnetizing current takes over and discharges the parasitic capacitances across the switching elements and the transformer in a monotonic way while charging the parasitic capacitance across SR1 in the same monotonic way without ringing and spikes. The discharge the parasitic capacitances of M1 and M2 and the transformer by the magnetizing current will create zero voltage switching conditions for M2 which will turn on at t6.

In the case of class C USB power delivery standard for adapters, the output voltages can be 5V, 9V, 12V, 15V or 20V. The range is 4:1 and the input voltage range is from 90 Vac to 270 Vac.

To be able to accommodate the "synchronized timely loaded soft switching half bridge critical operation mode" under all those conditions it is very difficult. That will require building a transformer with a very high turns ratio which may not be technological feasible. In such application for most of the output voltages for example ranging from 9V, 12V, 15V and 20V the converter will operate in a "synchronized timely loaded boost derived soft switching half bridge operating in critical mode" wherein the current through the output inductor element starts from zero and ends up at zero within the on time of the primary switchers conduction. For 5V output, especially large input voltage that may not be possible. In such case the converter has to operate in "synchronized partially unloaded boost derived soft switching half bridge operation mode" as depicted in FIG. 19.

Figure 19:
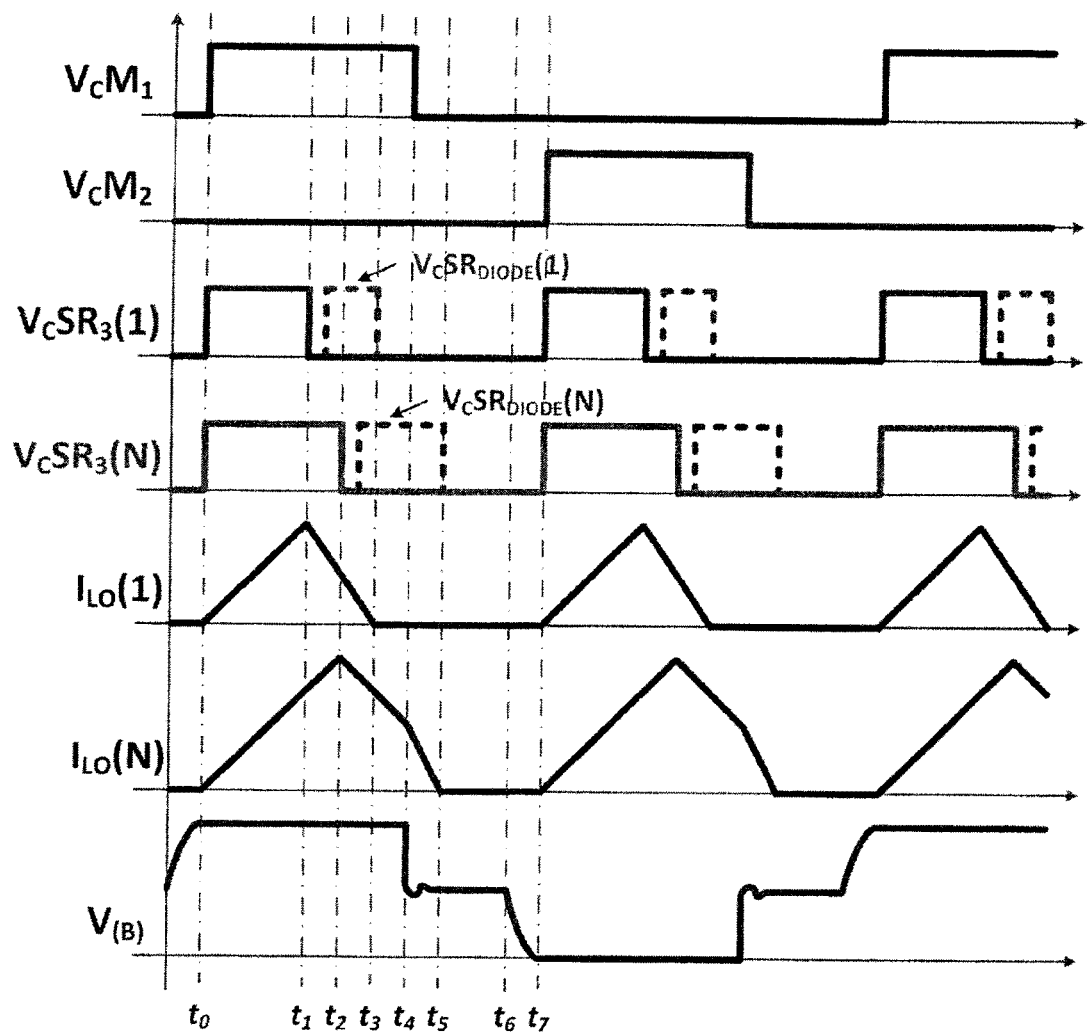
FIG. 19 depicts the key waveforms of the topology presented in FIG. 17 wherein the output #1 operates in synchronized and timely loaded mode and the output #N operates in synchronized and partially unloaded non critical mode.

In FIG. 19 are depicted two outputs, output 1 which operates in a "synchronized timely loaded" mode wherein the current through the inductive element Lo1 starts from zero and reaches zero within the conduction time of the primary switch M1. The second output, output N, which has a lower voltage and the current through LoN does not reach zero during the conduction time of M1 the operation will be in a "synchronized partially loaded mode".

For output 1 we have the following:

At t0 the primary switch M1 turns on. At the same time the synchronous rectifier SR3 turns on as well. The current through Lo1 will ramp up and reach peak amplitude at t1.

At t1 SR3(1) turns off. The current will continue to flow through the body diode of SRdiode(1) initially but shortly after t1 the SRdiode(1) will turn on offering a very low impedance path for I(Lo). After t1, the current through Lo1 will ramp down with a slope proportionate with the difference between the output voltage and the input voltage reflected into the secondary winding.

At t3 the current through Lo1 will reach zero and SRdiode (1) will turn off. SRdiode(1) can be further maintained into conduction for a short period of time and create a negative current referred previously as "push back current". That current will add to the magnetizing current and at time t6 when the SR1 will turn off, it will be transferred to the primary to discharge the parasitic capacitances of M1 and M2 to zero and create zero voltage switching conditions for M2.

At t4 the primary switch M1 turns off. The voltage in the switching node B will swing down to the half input voltage level which is the steady state voltage across Cr.

At t6 the SR1 will turn off and the magnetizing current and the "push back current" will be transferred to the primary to discharge the parasitic capacitances across M2 to zero.

At t7 the primary switch M2 turns on at zero voltage.

For the output 1 the presence of the dead time between t4 and t6 it is not necessary because the power transfer from the primary to secondary is finalized at t3.

For output N we have the following:

At t0 the primary switch M1 turns on. At the same time the synchronous rectifier SR3 turns on as well. The current through Lo1 will ramp up and reach peak amplitude at t2.

At t2 SR3N turns off. The current will continue to flow through the body diode of SRdiode(N) initially but shortly after t2 SRdiode(N) will turn on. After t2, the current through LoN will ramp down with a slope proportionate with the difference between the output voltage and the input voltage reflected into the secondary winding.

At t4 the primary switch M1 will turn off and the current will still continue to flow through LoN and the SR1 and SR2. The voltage across Lo after t4 is the output voltage and the slope of current is steeper and it will reach zero current level at t5. After the current through Lo1 will reach zero and SRdiode(N) will turn off. Like in the case of output 1, SRdiodeN can be further kept into conduction for a short period of time and create a negative current referred as "push back current". That current will add to the magnetizing current and at time t6 when the SR1 will turn off, both currents will be transferred to the primary to discharge the parasitic capacitances of M1 and M2 and create zero voltage switching conditions for M2.

At t6 the SR1 will turn off and the magnetizing current and the "push back" current will be transferred to the primary to discharge the parasitic capacitances across M1 and M2.

At t7 the primary switch M2 turns on at zero voltage.

For the output N the presence of the dead time between t4 and t6 it is absolutely necessary because the power transfer from the inductor element LoN to the load continues until t5 which is during the dead time.

Function of the output voltages and the input voltage conditions the controller has to change the mode of operation between "synchronized timely loaded boost derived critical mode" to "synchronized partially unloaded boost derived soft switching half bridge mode".

Bidirectional Operation Mode

The soft switching boost derived half bridge topology it is also suitable with the energy flow in reverse from the output towards the input. It is a good topology for bidirectional power transfer.

Figure 20:
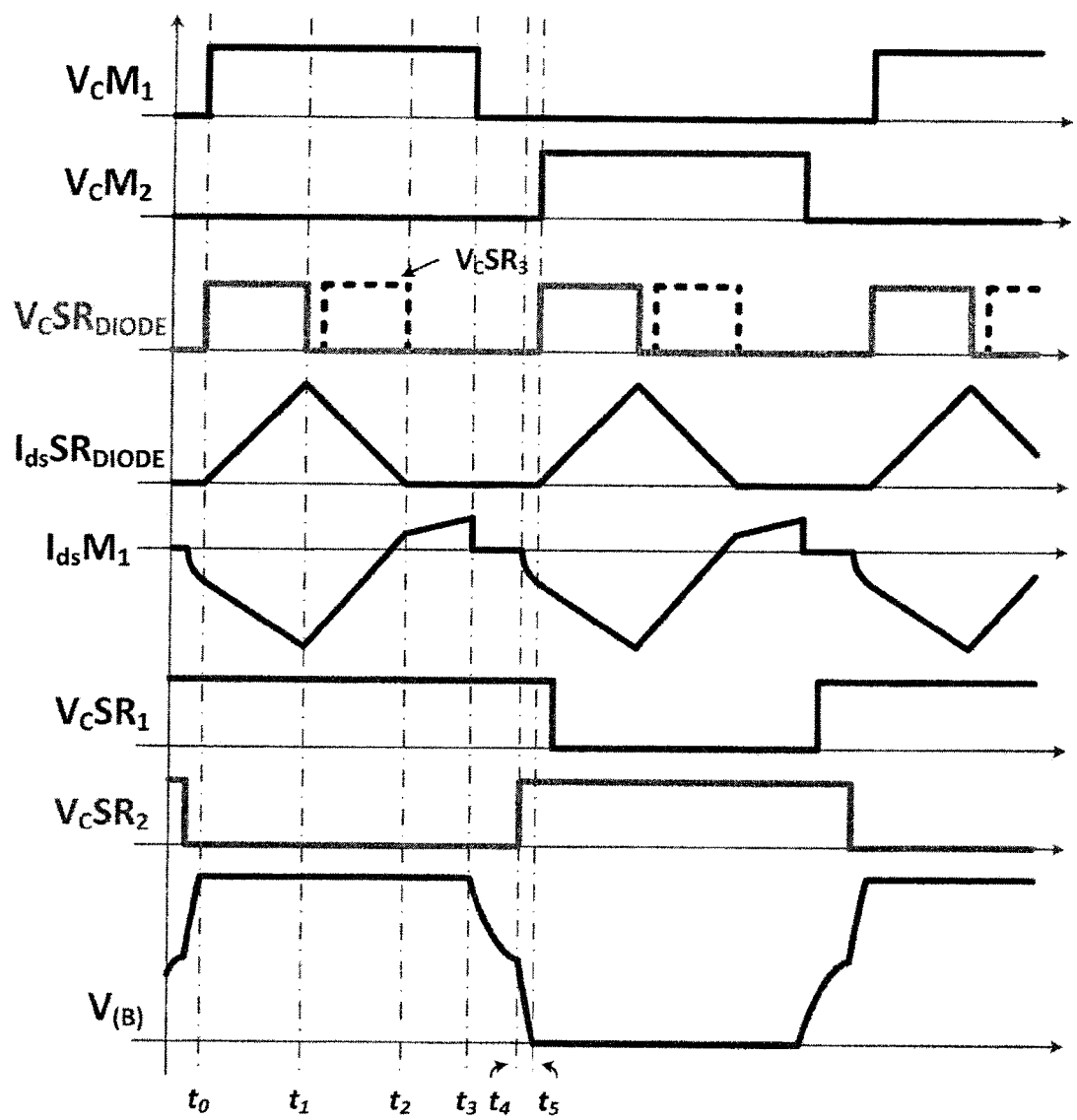
FIG. 20 depicts the key waveforms of the topology presented in FIG. 12 wherein the power transfer is done in reverse form the Vo towards the Vin.

The circuit depicted in FIG. 12 can operate in reverse which means that the power can be transferred from the output, Vo, towards input, Vin. In FIG. 20 are depicted the key waveforms such as the control for the primary switch M1, VcM1, the control signal for the primary switch M2, VcM2, the control signal for the SRdiode, VcSRdiode, the control signal for SR3, VcSR3, the current through SRdiode, the current through the primary switch M1, IdsM1, the control signal for SR1, VcSR1, the control voltage for SR2, VcSR2 and the voltage in switching node B.

At t0 the primary switch M1 turns on, SR1 was already conducting and SRdiode is turned on as well. Prior M1 is turned on there was a magnetizing current flowing from source to drain of the M1. The magnetizing current flowing from source to drain discharged the parasitic capacitance of M1 creating zero voltage switching conditions.

In the secondary when SRdiode is turned on at to, while SR1 was already on the current starts to build up through Lo flowing from the output towards the switching node A and further through L21 and SR1. This current will reflect into the primary and flow from the source towards the drain of M1 towards the input voltage Vin.

The current through Lo will reach a peak at t1 and the same applies to the current through M1, though of negative polarity flowing towards the input source Vin.

At t1 SRdiode turns off and the current will continue to flow through the body diode of SR3 initially and shortly after SR3 is turned on. The voltage in switching node A is the input voltage divided by the turns ration. As a result while SR3 is conducting the voltage across Lo is the reflected voltage form the input and forces the current through Lo to ramp down towards zero. At t2 this current reaches zero and SR3 can be turned off.

Between t2 to t3 the magnetizing current will further ramp up through M1 because M1 is still conducting. At t3, M1 is turned off and initiate the transition of the voltage in switching node B from the Vin towards zero initiated by the energy contained in the leakage inductance.

At t4 the SR1 will turn off and the magnetizing current will be transferred in the primary discharging in a monotonic way the voltage across M2 towards zero and charging the parasitic capacitance across SR1 in a monotonic way without spikes and ringing to the steady state level.

At t5 the primary switch M2 turns on at zero voltage switching conditions.

The topology depicted in FIG. 12, which is a key embodiment of this invention, can operate in soft switching and transfer the energy bidirectional.

Synchronized timely loaded soft switching half bridge operating in critical mode wherein the energy transfer from primary and secondary is fully done during the conduction time of the primary switch, and no dead time besides the transition time. In this operation mode the energy in the leakage inductance it is also fully recycled.

Quasi-Resonant Energy Transfer Mode

Another way of shaping the current through Lo in order to reach zero level before the primary switch is turned off it is by employing a resonant circuit.

Figure 21:
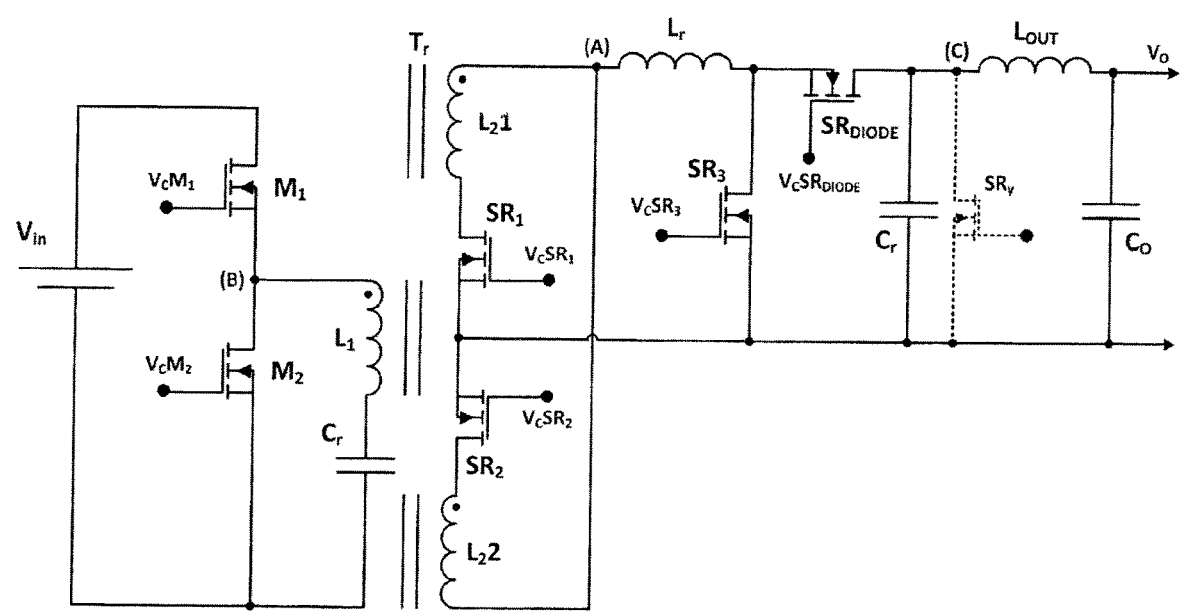
FIG. 21 depicts the synchronized boost derived timely loaded through quasi-resonant current shaping, soft switching half bridge
Figure 22:
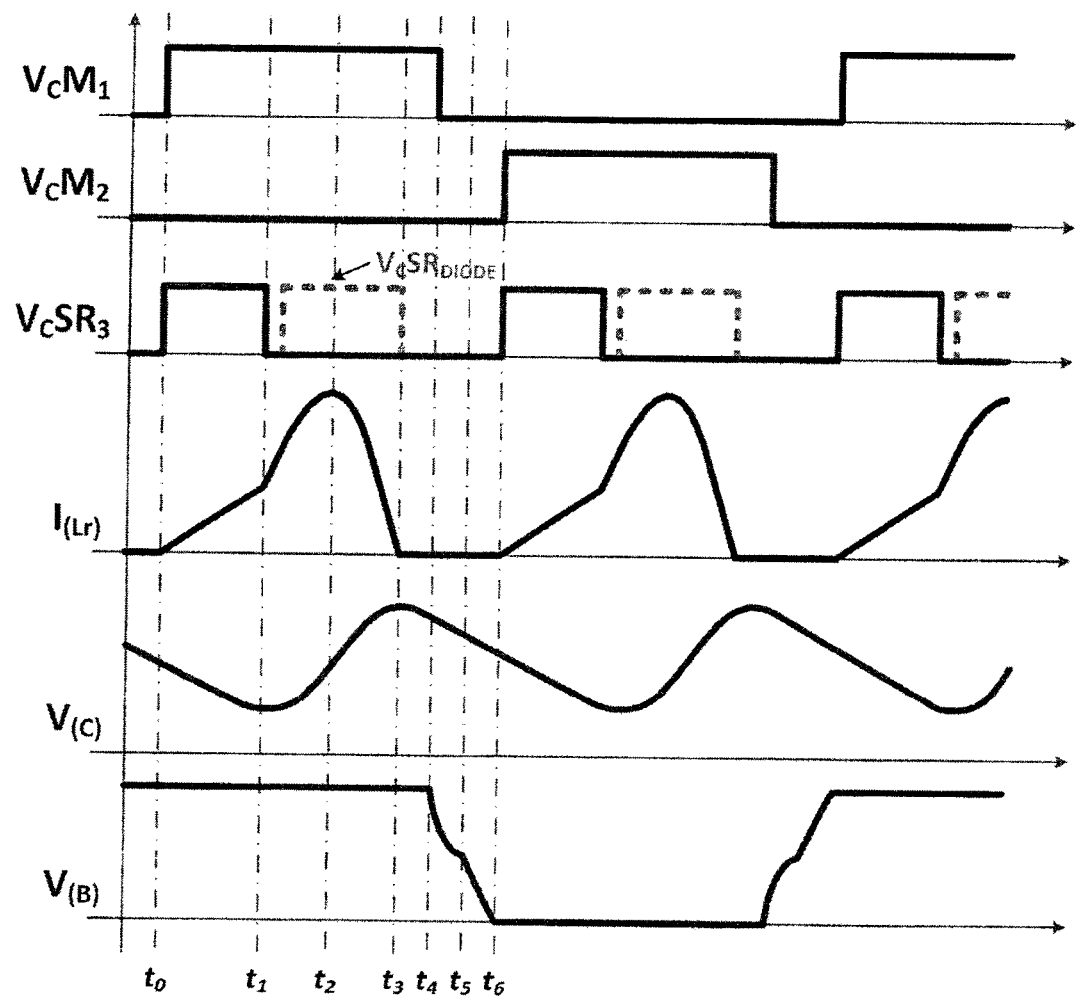
FIG. 22 depicts the key waveforms of the topology depicted in FIG. 21.

In FIG. 21 is presented such a circuit and the key waveforms are depicted in FIG. 22.

In FIG. 21 is depicted the general configuration of a half bridge topology with center tap and synchronized rectification with a "synchronized timely loaded boost derived" configuration as presented in several of the previous embodiments. The single difference is that the inductor element name changed from Lo to Lr. In addition to that there is added a resonant capacitor Cr and an output inductor Lout. As an option, function of the mode of operation, a synchronized rectifier SRy is inserted across Cr as depicted in FIG. 21.

In FIG. 22 there are depicted the key waveforms such and the control signal for M1, VcM1, the control signal for M2, VcM2, the control signal for SR3 and SRdiode, VcSR3 and VcSRdiode, the current through Lr, the voltage in the switching node C, V(C) and the voltage in the switching node B, V(B).

At t0, the primary switch M1 and SR3 turns on. As in the previous embodiment SR3 may turn on slight earlier when the voltage in switching node A is zero. The current will start ramping up linearly through Lr until t1. At t1, SR3 turns off. Shortly after that SRdiode will turn on. The inductive element Lr together with Cr form a resonant circuit with initial conditions, these conditions being the current through Lr at t1 and the voltage across Cr at t1. This resonant circuit with initial condition will resonate and the current I(Lr) will be shaped in a sinusoidal shape and the voltage across Cr in a cosinusoidal shape. The current through Lr will reach its peak at t2 and zero value at t3. At t3 the voltage across Cr will reach its peak. At t3 the energy transfer from the primary to Cr is finalized and after that the energy stored in Cr will be further transferred to the load.

In the event wherein t1 coincides with t0 and there is no initial current through Lr, the peak current will be defined by the voltage induced in the secondary winding divided by the characteristic impedance formed by the resonant circuit Zc=√(Lr/Cr). In such a case the voltage across Cr will reach twice the voltage induced in the secondary of the transformer. Between t3 to t4 the voltage across Cr will start decaying being discharged by the current flowing through Lout towards the load.

At t4 the primary switch M1 turns off and the voltage in the switching node B will start decaying initially in a resonant way caused by the energy stored in the leakage inductance and after SR1 turns off at t5, will decay linearly and monotonic towards zero. Cr will further decay transferring the energy to the load via Lout.

At t6 the primary switch M2 will turn on at zero voltage switching conditions.

The energy transfer to the primary to the secondary it is controlled by the time interval t0 to t1. In the event that time interval is zero there is a minimum quantum of energy which is transferred from primary to secondary at each cycle which is function of the characteristic impedance of the resonant circuit, and the input voltage reflected in the secondary. This circuit can operate quite well also in the "synchronized partially unloaded mode" where there is a dead time between the conduction time of the primary switchers. By increasing the dead time in between the primary switchers the voltage across Cr will decrease at the time primary switchers turn on and that will translate in an increased quantum of energy transfer at each cycle. To create a boundary and make the energy transferred to the load directly proportional with the operation frequency of the primary switchers a diode or a synchronized rectifier SRy is placed and turn on when the voltage in C becomes zero. In this way the voltage in C will never go below zero. In such mode of operation the energy transferred to the secondary it is controlled by two parameters. One parameter is the repetition frequency and the other parameter is the time interval between t0 to t1.

This quasi resonant mode of operation shapes the current through Lr to reach zero before the turn off of the primary switch with less influence of the level of the output voltage as presented in the previous embodiments. This circuit can also increase of energy transfer to the load during the conduction time of the primary switchers. In addition to that the leakage inductance in the transformer is part of Lr and in some application Lr it is reduced just to the leakage inductance in the transformer. In addition to that Lr or a portion of Lr can be transferred in the primary in series with the transformer.

Figure 23:
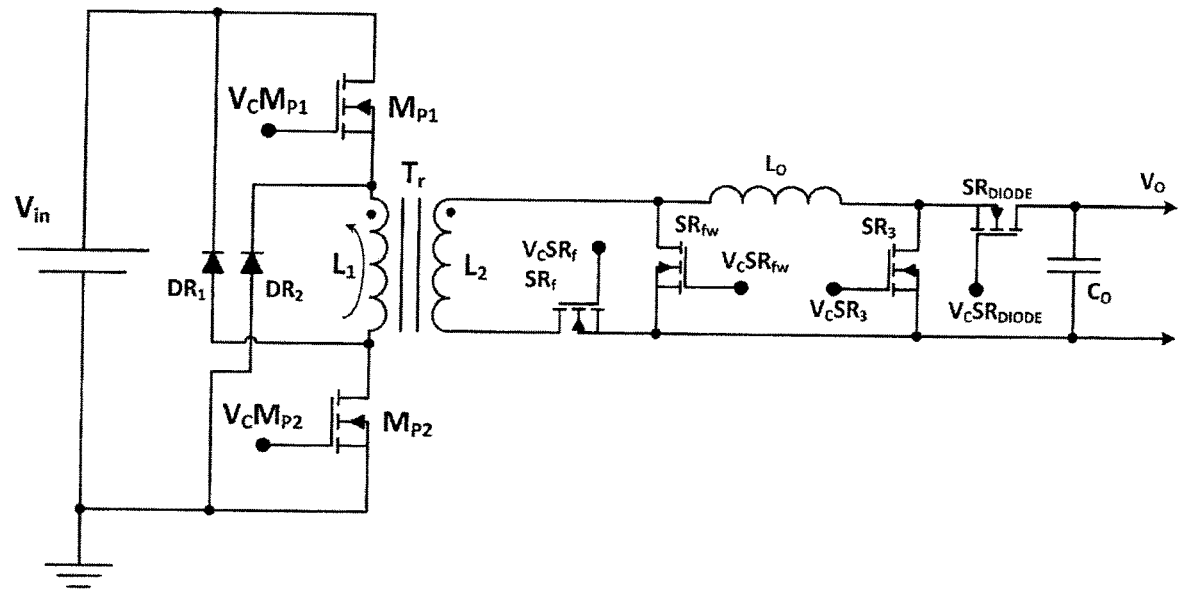
FIG. 23 depicts the synchronized boost derived soft switching two transistor forward topology

Soft Switching Two Transistors Forward Converter Operating in a Synchronized Partially Unloaded Mode This methodology of power processing can be applied also to single ended topologies. In FIG. 23 is depicted a two transistors forward topology with the additional circuit formed by SR3 and Sr diode. In the primary the two transistor forward topology contains two switchers Mp1 and Mp2, two reset diodes DR1 and DR2 and the primary winding of the transformer, L1.

In the secondary we have the secondary winding L2, the forward synchronized rectifier SRf, the freewheeling synchronized rectifier SRfw, the inductive element Lo, the boost switch SR3 and the boost rectifier SRdiode.

This boost derived soft switching two transistor forward can operate in a synchronized partially unloaded mode wherein there is a dead time wherein SRf and SRfw conduct in the same time and during this dead time the energy contained in Lo is further transferred to the load, or a synchronized timely loaded mode wherein the energy is fully transferred to the load during the conduction time of the primary switchers.

Figure 24:
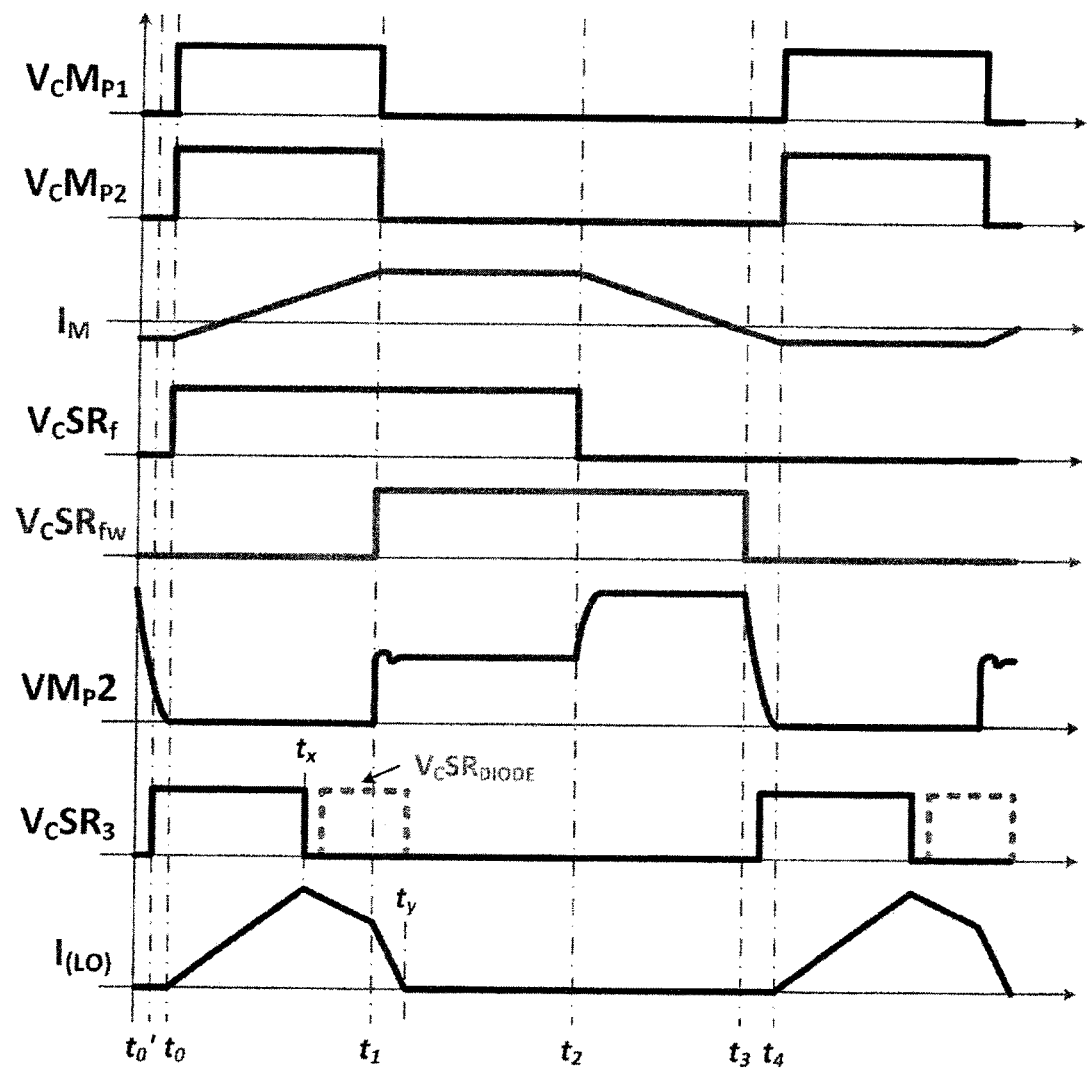
FIG. 24 depicts the key waveforms of the topology presented in FIG. 23 wherein the operation is done in a synchronized partially unloaded mode.

In FIG. 24 are presented the key waveforms of the topology depicted in FIG. 23, when the converter operates in a "synchronized partially unloaded mode". Partially unloaded mode of operation require a dead time period wherein both synchronized rectifiers in the secondary in this case. SRf and SRfw conduct and during a portion of this time the energy contained in Lo is further transferred to the load.

The key waveforms are depicted in FIG. 24, the control signal for the primary switch Mp1, VcMp1, the control signal for the second primary switch Mp2. VcMp2, the magnetizing current IM, the control signal for the forward synchronized rectifier SRf, VcSRf, the control signal for the freewheeling synchronized rectifier SRfw, VcSRfw, the voltage across secondary primary switch VMp2, the control signal for SR3 and SRdiode, VcSR3 and VcSRdiode and the current through the inductor element Lo, I(Lo).

At t0, both primary switchers Mp1 and Mp2 are turned on. At the same time the synchronous rectifier SRf and SR3 are turned on as well, though SR3 can be turned slight earlier at the time the voltage in the secondary winding is zero. A voltage is induced in the secondary with the plus at the dot and the current start ramping up linearly through Lo reaching its peak at tx. In the same time the magnetizing current will start building up from a negative level to a positive level at t1.

At tx the boost synchronous rectifier SR3 is turned off. The current through Lo will continue to flow originally through the body diode of SRdiode which is turn on shortly after tx. In the event wherein the output voltage Vo it is larger than the voltage induced in the secondary winding L2, the current starts to ramp down towards zero. In the event the output voltage is lower than the voltage induced in L2 the current through Lo will ramp up with a slope proportionate with the difference between the voltage induced in the secondary winding and the output voltage. Such a situation can occur at turn on when the voltage across Co is did not reach the steady state level. The magnetizing current will also build up during the time interval t0 to t1 from a negative level to a positive level. In this topology the amplitude of the magnetizing current of the positive level is much higher than the amplitude of the negative level.

At t1 the primary switchers Mp1 and Mp2 are turned off and also SRfw is turned on as well. The magnetizing current in the primary will start charging the parasitic capacitance across Mp1 and Mp2 until the voltage across them reaches half of the input voltage level. That is because the two parasitic capacitances across Mp1 and Mp2 will create a capacitive divider. In the secondary both synchronous rectifiers, SRf and SRfw will conduct creating a short circuit for the magnetizing current which will maintain its amplitude. The current through Lo will continue to flow with a steeper negative slope and the voltage across Lo is the output voltage Vo. The current through Lo will start ramping down towards zero reaching zero level at ty when SRdiode is turned off.

Between ty to t2 when both synchronous rectifiers SRf and SRfw are conducting is referred in this patent as the dead time of the two transistor forward topology.

At t2 SRf turns off and the magnetizing current a will start the reset cycle wherein DR1 and Dr2 are pushed into conduction and the voltage in the drain of Mp2 will reach the input voltage level and the voltage in the source of Mp1 will reach zero. From t2 to t3 the reset of the transformer is done wherein the magnetizing current starts decaying towards the level it had at to.

At t3 the synchronous rectifier SRfw is turned off which coincides with the end of the reset cycle of the transformer. The magnetizing current will start discharging the parasitic capacitance of the primary switchers towards zero.

At t4 the primary switchers Mp1 and Mp2 will turn on under zero voltage switching conditions.

It has to be mentioned that in the traditional two transistors forward topology the reset cycle starts at t1 when the primary switchers turn off And after the resent cycle the dead time will start. This topology can operate in this mode as well. In the event we keep the conventional mode of operation with the reset cycle after the on time of the main switch the energy stored in Lo at t1 will be recycled to the primary and not transferred to the load.

The preferred mode of operation for the soft switching two transistor forward is "synchronized timely loaded" wherein the energy transferred from the primary to the load is finalized during the conduction time of the primary switchers. In such an operation mode there is no need for dead time and the two transistor topology can operate in critical mode as depicted in FIG. 25.

Figure 25:
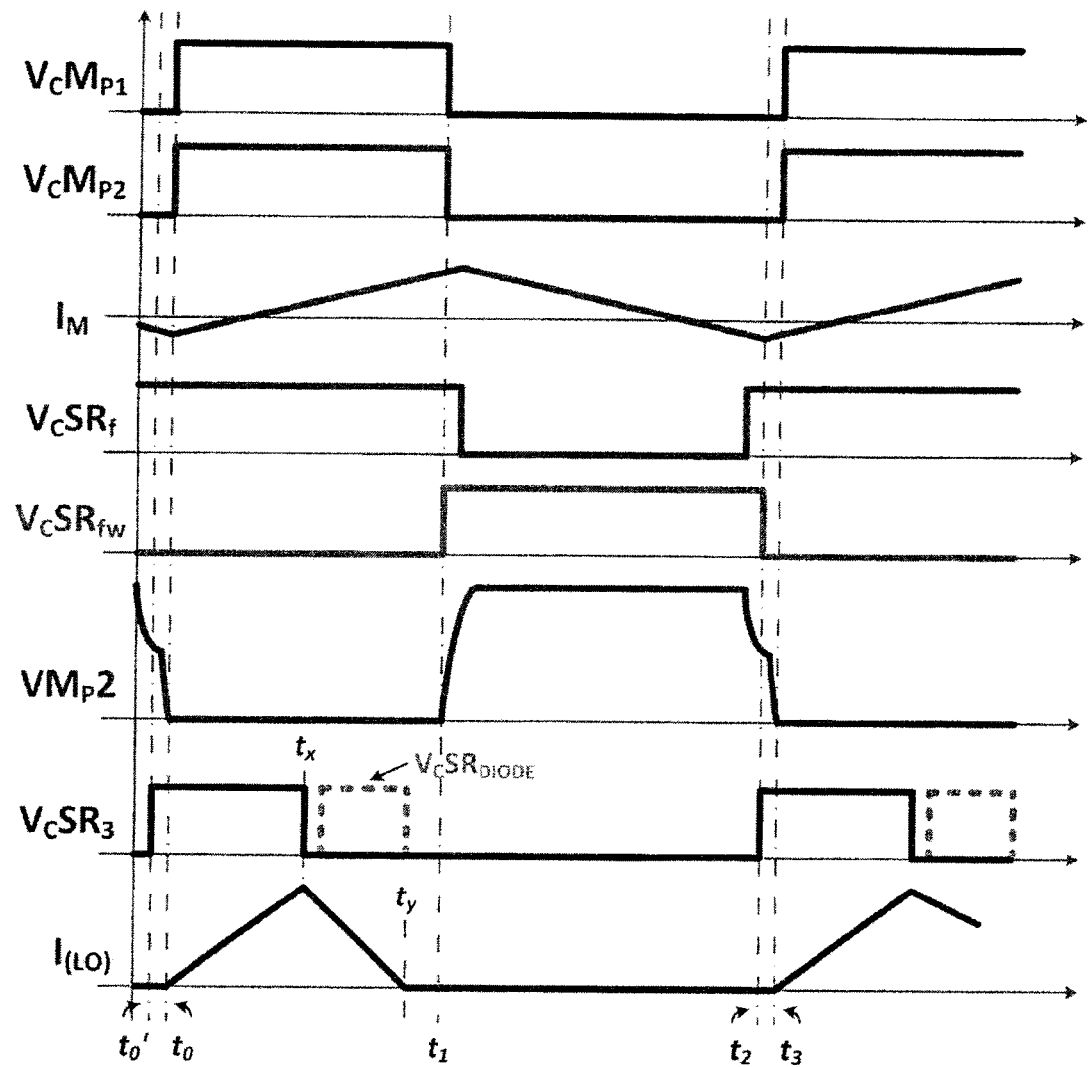
FIG. 25 depicts the key waveforms of the topology presented in FIG. 23 wherein the operation is done in a synchronized timely loaded and critical mode.

In FIG. 25 are depicted the key waveforms of the soft transition two transistor forward operating in synchronized timely loaded critical mode without a dead time. The key waveforms depicted in FIG. 25 are the same as the key waveforms depicted in FIG. 24.

At t0 the primary switchers Mp1 and Mp2 are turned on. At the same time or slightly before, when the voltage across L2 is zero, the synchronous rectifier SR3 is turned on. The current through Lo starts to build up reaching a peak at tx.

At tx SR3 is turned off. The current will continue to flow through Lo via the body diode of SRdiode which is turned on shortly after Tx. The voltage across Lo after tx is the difference between the output voltage and the input voltage reflected to the secondary. The current through Lo will start to ramp down towards zero and reach zero at ty.

At t1 the primary switchers turn off and the magnetizing current will push Dr1 and Dr2 into conduction starting the reset cycle of the transformer. Between t1 and t2 the transformer is reset and the magnetizing current will start decaying until they reach the same level as they had at to.

At t2 the SRfw is turned off and the magnetizing current will start discharging the parasitic capacitances across Mp1 and Mp2 creating zero voltage switching conditions.

At t3 Mp1 and Mp2 turn on at zero voltage switching conditions and the power processing cycles repeats.

Soft Switching constant voltage reset forward converter operating in a synchronized partially unloaded mode.

Figure 26:
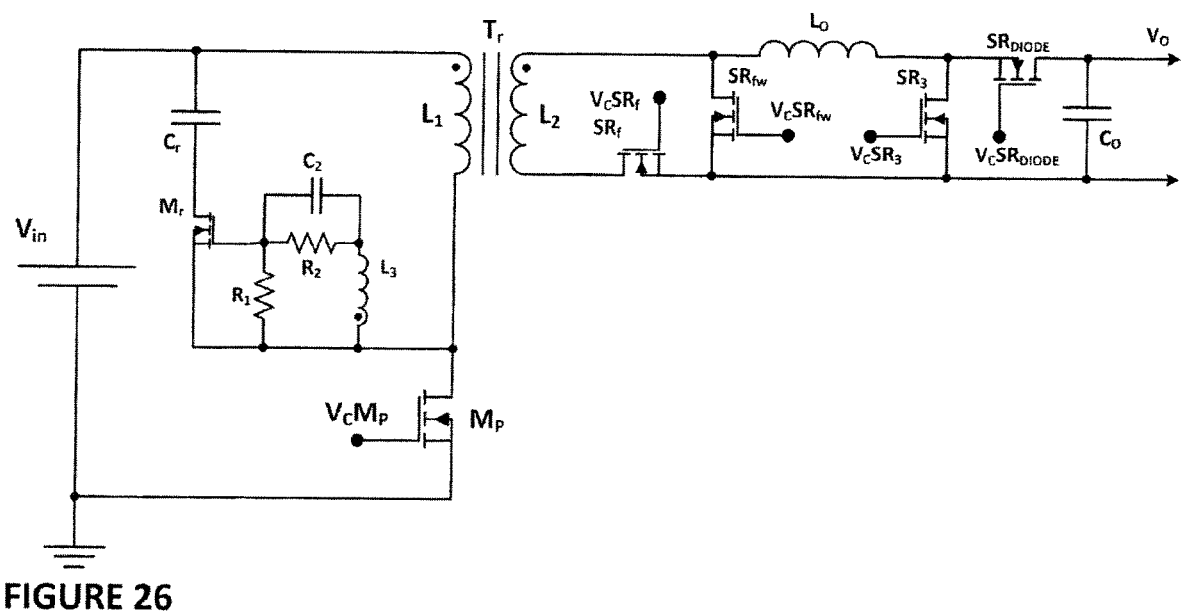
FIG. 26 depicts the synchronized boost derived soft switching forward with constant voltage reset.

This methodology of power processing can be applied also to single ended forward with constant voltage reset. This topology was described by Ionel "Dan" Jitaru in the APEC2003 in the article "Self-driven Constant Voltage Reset Circuit" pages 893-897. This topology is depicted in FIG. 26. It consists of a primary switch Mp, an auxiliary switch Mr, a clap capacitor Cr and a network of passive components, R1, R2, C2 and an auxiliary winding L3. In the secondary we have the same configuration as the two transistors forward topology. A secondary winding L2, two synchronized rectifiers SRf and SRfw, an inductive element Lo, a boost switch SR3 and a boost diode SRdiode.

Figure 27:
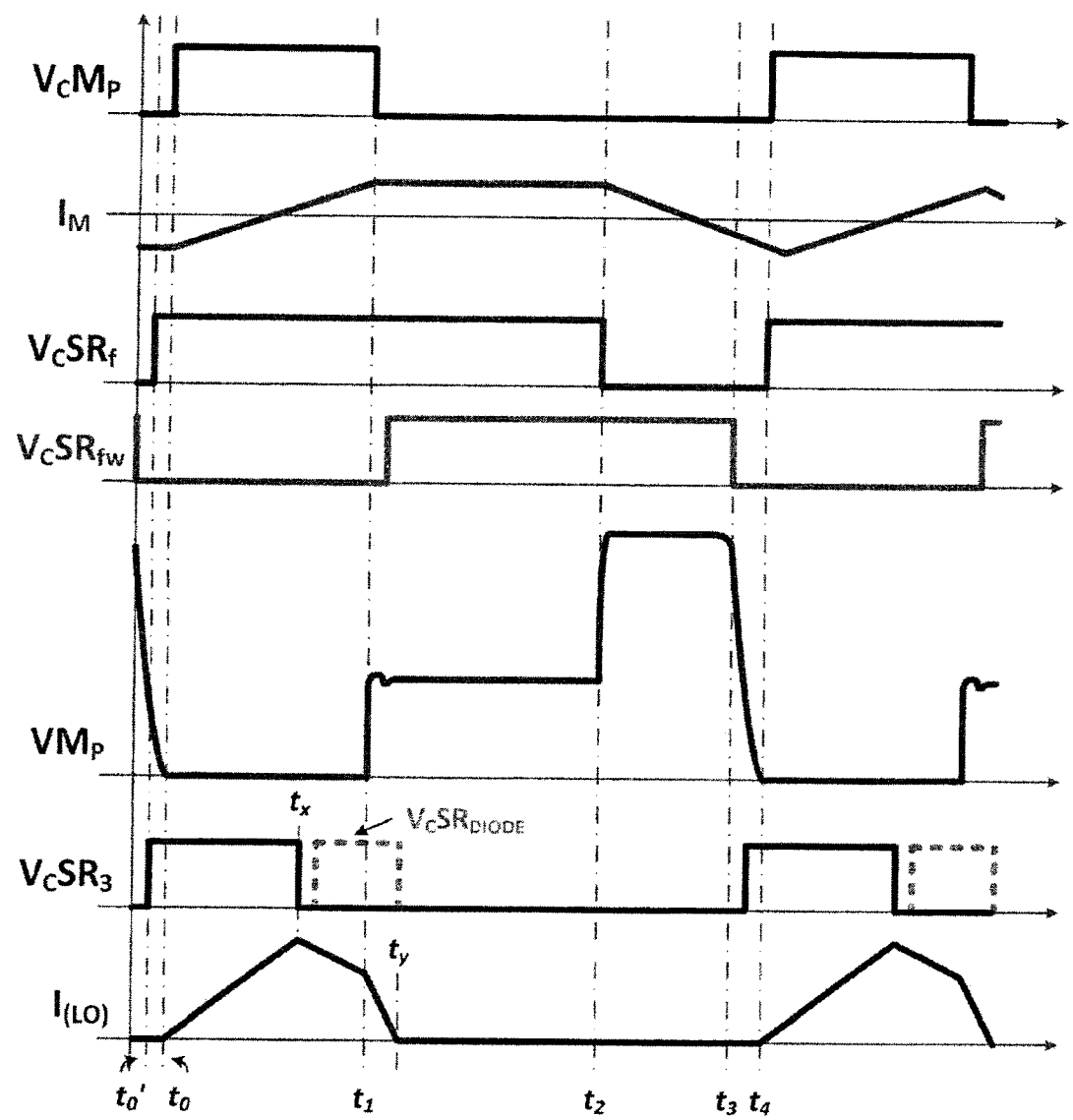
FIG. 27 depicts the key waveforms of the topology presented in FIG. 26 wherein the operation is done in a synchronized partially unloaded mode.

In FIG. 27 are depicted the key waveforms for this topology such as the control signal for Mp, VcMp, the magnetizing current IM, the control signal for SRf, VcSRf, the control signal for SRfw, VcSRfw, the voltage across Mp, VMp, the control signals for SR3 and SRdiode, VcSR3 and VcSRdiode and the current through Lo.

At t0 the primary switch Mp turns on. The SR3 turns on at to or slight earlier, t0' when the voltage in the secondary winding L2 is zero. The current through Lo will start ramping up from zero to a peak level at tx.

At tx the SR3 is turned off. The current through Lo will continue to flow initially through the body diode of SRdiode and SRdiode will turn on shortly after tx. The current through Lo will start ramping down with a slope proportional to the difference between the output voltage and the input voltage reflected in the secondary.

At t1 the primary switch Mp is turned off. At t1 the voltage across Mp will start to rise until it reaches the input voltage level. At that time the voltage in the secondary of the winding is zero. Both synchronized rectifiers SRf and SRfw are on and create a short circuit across the secondary winding. After t1 the voltage across Lo is the output voltage and the current decays with a steeper slope towards zero reaching zero at ty.

At t2 SRf turns off and that opens up the short circuit in the secondary allowing the magnetizing current to charge the parasitic capacitance of Mp. The voltage across Mp will reach the voltage across Cr which is proportional with the duty cycle of operation and the turn ratio between L3 and L1. The reset cycle starts at t2 and ends up at t3.

At t3 the SRfw is turned off and the magnetizing current will start discharging the voltage across Mp towards zero. That is possible because the short in the secondary is removed once SRf is turned off.

At t4, Mp turns on at zero voltage switching conditions and the cycle repeats.

The presence of the dead time between t1 and t2 is necessary in order to finalize the energy transfer from Lo to the load which ends at ty. Unlike in the publication of Mr. Ionel Dan Jitaru, the reset cycle (t2 to t3 starts after the dead time (t1 to t2), while in Mr. Jitaru publication the resent cycle starts after the Mp turns off and after that there the dead time starts.

Like in the two transistors forward topology after the conduction time of the primary switch Mp, in the event wherein the energy in the inductive element it is not depleted, the cycle which follows has to be a dead time wherein SRf and SRfw should conduct in order to transfer the remaining energy to the load.

Figure 28:
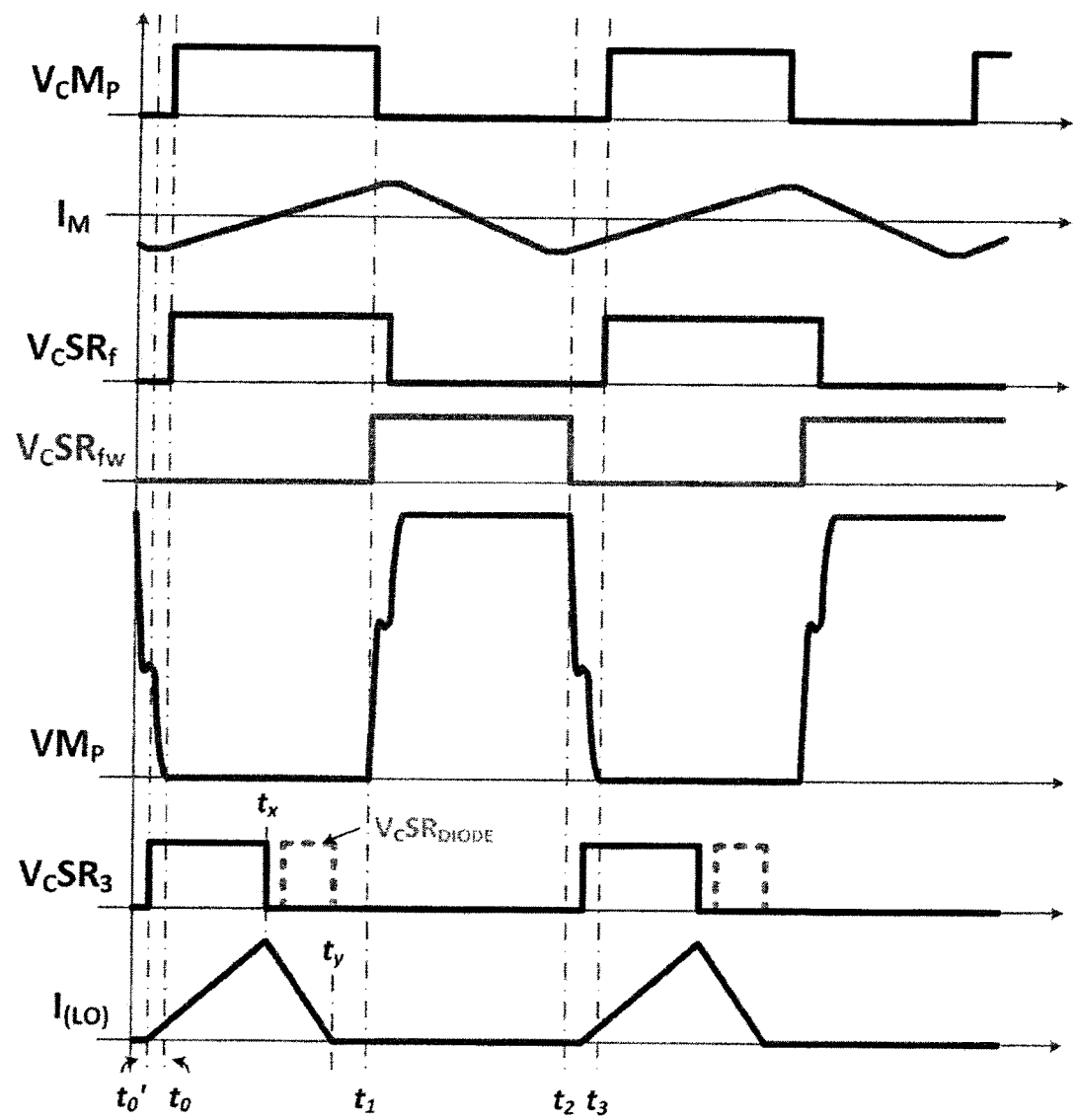
FIG. 28 depicts the key waveforms of the topology presented in FIG. 26 wherein the operation is done in a synchronized timely loaded, critical mode.

Soft Switching Constant Voltage Reset Forward Converter Operating in a Synchronized Timely Loaded and Critical Mode In FIG. 28 is presented the synchronized timely loaded and critical mode of operation wherein the energy is fully transferred from the primary to the secondary during the conduction time of the primary switch. In this mode of operation the dead time is not needed anymore. The key waveforms depicted in FIG. 28 are the same as those depicted in FIG. 27.

At t0 the primary switch Mp turns on. The SR3 turns on at to or slight earlier, t0', at the time when the voltage in the secondary winding L2 reaches zero. The current through Lo will start ramping up from zero to a peak level at tx.

At tx the SR3 is turned off. The current through Lo will continue to flow initially through the body diode of SRdiode and SRdiode will turn on shortly after tx. The current through Lo will start ramping down with a slope proportional to the difference between the output voltage and the input voltage reflected in the secondary winding.

At ty the current through Lo will reach zero and SRdiode will turn off. At ty the energy transfer from the primary to the secondary is completed.

At t1 the primary switch Mp is turned off and the magnetizing current will charge the parasitic capacitance of Mp to the level of the reset voltage. The reset cycle take place between t1 to t2 wherein the charge going into Cr equalizes the charge going out of Cr. At t2 the reset cycle ends and the magnetizing current which now has an opposite polarity will start discharging the parasitic capacitance across Mp towards zero.

At t3 the primary switch Mp turns on at zero voltage and the cycle repeats.

All these methodologies of power processing do apply for other configuration in the primary such as full bridge, phase shifted full bridge, asymmetrical half bridge and asymmetrical full bridge, and push pull without deviating from the scope of the patent.

The inductor element Lo can be also transferred to the primary and have in the primary a half bridge topology which can work in a "synchronized timely loaded mode" as the prefer mode of operation. In the primary we can substitute the half bridge topology with a full bridge phase shifted. In this way we can operate also in synchronized partially unloaded mode.

This configuration can be implemented in the AC-DC converters wherein PFC is required. This can also work with multiple outputs. One application would be an isolated power factor correction wherein the inductor element is placed in the primary of the transformer and the transformer has two secondary windings. One winding will have a reduced number of turns for the main output and another one with large number of turns wherein the boost synchronized rectifier it is not placed, and there is only a SRdiode connected to a larger capacitor which is responsible for the ripple steering. The value of this capacitor will be amplified by the turn ratio and it will be practically in parallel with the capacitor of the main output acting as a ripple steering for the line frequency.

Thus, as seen from the foregoing description, the present invention provides a half bridge switching cell composed by two primary switching elements connected in totem pole, across an input voltage source, wherein the common connection of said primary switching elements is referred as primary switching node, further comprising a transformer having a primary winding in series with a capacitor, connected in between said primary switching node and to said input voltage source, and two secondary windings connected to the drains of two synchronized rectifiers each one of said synchronized rectifiers corresponding to one of the primary switchers, in a such way that each of said synchronized rectifier conducts when the corresponding primary switching element is not conducting, and the other ends of said secondary windings not connected to said synchronized rectifiers tied together in a common connection, and connected to at least one controlled current source.

The versions of the present invention may have some or all of the following features:

a. The primary switching elements are conducting alternatively with a dead time in between when said primary switching elements do not conduct and the polarity of the transformer windings is done in a such way that the when each of said primary switching elements is conducting the synchronized rectifier which is not the correspondent of said primary switching element which is conducting, is conducting and both of said synchronized rectifiers are conducting in the same time during said dead time of the primary switchers.

b. At least one controlled current source is formed by an inductor element connected to said common connection of said secondary windings and to the source of an additional synchronized rectifier further connected to an output capacitor which is connected in parallel with the a load, wherein said additional synchronized rectifier is on during at least a portion of the time when said primary switchers are on and turns off when the current through said inductive element is zero or slight negative.

c. At least one controlled current source is formed an inductor element connected to said common connection of said secondary windings and to a switching node which is the common connection of two additional synchronized rectifiers connected in a totem pole configuration placed across an output capacitor and a load, wherein the additional synchronized rectifier connected to ground is referred as a boost switch and the additional synchronized rectifier connected to the output capacitor and the load is referred as the diode switch, wherein the boost switch is on during at least a portion of the time when said primary switchers are on and the diode switch turns on after the boost switch turns off and it is on until the current through said inductive element reaches zero or slightly negative. Moreover, the secondary synchronized rectifiers are turning off and the magnetizing current of said transformer which exceeds the amplitude of the summation of all said controlled current source(s) at the time when said synchronized rectifiers turn off is transferred to the primary winding to discharge towards zero the parasitic capacitances of said primary switching elements creating zero voltage switching conditions at turn on for said primary switching elements.

d. The synchronized rectifiers are turning off and the magnetizing current of said transformer which exceeds the amplitude of ail the summation of all said controlled current source(s) at the time when said synchronized rectifiers turn off is transferred to the primary winding to discharge towards zero the parasitic capacitances of said primary switching elements creating zero voltage switching conditions at turn on for said primary switching elements.

e. The summations of all said controlled current source(s) reaches zero current before the secondary synchronized rectifiers turn off f. The summations of all said controlled current source reaches zero current before the primary switching elements turn off g. The diode switch conduction, in at least one of the controlled current sources is extended after the current through said inductive element reaches zero to extract some energy from the output and reversing the polarity of the current through said inductive element, wherein the current through the inductive element is flowing further through said secondary rectifiers and the body diode of boost switch, in a such way that when said synchronized rectifiers are turn off the current through said inductive element will flow into the primary to discharge the parasitic capacitances across said primary switching node in a such way that the primary switchers turn on at zero voltage switching conditions.

h. An additional diode is placed across the body diode of said boost switch, to conduct the current through the inductive element after the diode switch turns off i. The boost switch is turned on again after the diode switch turns off to conduct the current through the inductive element after the diode switch turns off j. The boost switch, in at least one of the controlled current sources, is turned on after the primary switch turns on with a controlled delay in order to control the amplitude of the current through the inductive element.

k. The control of the boost switch and the control of the diode switch is swap in order to reverse the energy flow from the secondary towards the primary.

With the foregoing disclosure in mind, it is believed that various adaptations of a half bridge switching cell, according to the principles of the present invention, will be apparent to those in the art.

The invention claimed is:

1. A two-transistor forward switching cell comprising:
two primary switching elements connected between an input voltage source and a primary winding of a transformer, wherein the input voltage source has two terminations and the primary winding has opposite ends;
the primary switching elements are connected to the primary winding at the opposite ends thereof;
reset diodes, wherein one of the reset diodes is connected between one of the opposite ends of the primary winding and one of the terminations of the input voltage source, and the other of the reset diodes is connected between another of the opposite ends of the primary winding and another of the terminations of the input voltage source;

two synchronous rectifiers, wherein one of the synchronous rectifiers is defined as a forward rectifier and is on during at least a portion of a time when the two primary switching elements are on, and the other of the synchronous rectifiers is defined as freewheeling rectifier and is off during the time when the two primary switching elements are on;

wherein the freewheeling rectifier is connected to at least one controlled current source; and wherein the two synchronous rectifiers are both on for a common predetermined time.

* * * * *